(12) United States Patent
Artieri et al.

(10) Patent No.: US 12,487,925 B2
(45) Date of Patent: Dec. 2, 2025

(54) RANK INTERLEAVING FOR SYSTEM META MODE OPERATIONS IN A DYNAMIC RANDOM ACCESS MEMORY (DRAM) MEMORY DEVICE

(71) Applicant: QUALCOMM Incorporated, San Diego, CA (US)

(72) Inventors: Alain Artieri, Saint Martin d'Heres (FR); Jungwon Suh, San Diego, CA (US); Subbarao Palacharla, San Diego, CA (US); Vikrant Kumar, Bangalore (IN); Riccardo Iacobacci, Cork (IE)

(73) Assignee: Qualcomm Incorporated, San Diego, CA (US)

( * ) Notice: Subject to any disclaimer, the term of this patent is extended or adjusted under 35 U.S.C. 154(b) by 32 days.

(21) Appl. No.: 18/495,215

(22) Filed: Oct. 26, 2023

(65) Prior Publication Data

US 2024/0402944 A1    Dec. 5, 2024

Related U.S. Application Data

(60) Provisional application No. 63/505,997, filed on Jun. 2, 2023.

(51) Int. Cl.
*G06F 12/06* (2006.01)

(52) U.S. Cl.
CPC ................. *G06F 12/0607* (2013.01)

(58) Field of Classification Search
CPC .................................................. G06F 12/0607
See application file for complete search history.

(56) References Cited

U.S. PATENT DOCUMENTS

| | | | |
|---|---|---|---|
| 6,715,025 B2* | 3/2004 | Kanno | G06F 12/0882 |
| | | | 710/305 |
| 11,288,188 B1 | 3/2022 | Tummala et al. | |
| 11,403,217 B2 | 8/2022 | Artieri et al. | |
| 11,520,706 B2 | 12/2022 | Artieri et al. | |

(Continued)

OTHER PUBLICATIONS

International Search Report and Written Opinion—PCT/US2024/023033—ISA/EPO—Jul. 24, 2024.

(Continued)

*Primary Examiner* — Chie Yew
(74) *Attorney, Agent, or Firm* — NORTON, ROSE, FULBRIGHT, US LLP

(57) ABSTRACT

This disclosure provides systems, methods, and devices for memory systems that support processing data and metadata within a memory of a memory device. In a first aspect, a method of controlling a memory device includes executing a first request in a first rank of the memory device during a first time period, wherein the first time period comprises a first data access portion and a first metadata access portion; and executing a second request in a second rank of the memory device during a second time period, wherein the second time period comprises a second data access portion and a second metadata access portion, wherein executing the first request in the first rank and executing the second request in the second rank comprises interleaving the first request and the second request between the first rank and the second rank. Other aspects and features are also claimed and described.

27 Claims, 17 Drawing Sheets

(56) References Cited

U.S. PATENT DOCUMENTS

| | | | |
|---|---|---|---|
| 11,704,183 | B2 | 7/2023 | Balakrishnan et al. |
| 2004/0128428 | A1* | 7/2004 | Christenson .......... G06F 13/161 |
| | | | 711/104 |
| 2012/0272013 | A1 | 10/2012 | Liou |
| 2015/0177993 | A1 | 6/2015 | Ide et al. |
| 2016/0232112 | A1 | 8/2016 | Lee |
| 2017/0132150 | A1* | 5/2017 | Hampel .............. G06F 12/1081 |
| 2018/0196709 | A1* | 7/2018 | Das ....................... G06F 3/0673 |
| 2020/0152256 | A1* | 5/2020 | Seo ........................ G11C 5/145 |
| 2020/0327010 | A1* | 10/2020 | Pandey .............. G06F 12/0802 |
| 2020/0401508 | A1 | 12/2020 | Hsu |
| 2021/0064463 | A1 | 3/2021 | Suh et al. |
| 2021/0255803 | A1 | 8/2021 | Kanno |
| 2021/0358559 | A1 | 11/2021 | Suh et al. |
| 2022/0197561 | A1 | 6/2022 | Na |
| 2022/0358042 | A1 | 11/2022 | Malladi et al. |
| 2023/0260565 | A1 | 8/2023 | Gieske et al. |
| 2023/0297290 | A1 | 9/2023 | Yoshida et al. |
| 2024/0126438 | A1 | 4/2024 | Suh et al. |

OTHER PUBLICATIONS

Lee C.K., et al., "An 8.5-GB/s/Pin 12-GB LPDDR5 SDRAM With a Hybrid-Bank Architecture, Low Power, and Speed-Boosting Techniques", IEEE Journal of Solid-state Circuits, 2020, pp. 1-13.
Lin Y-H., et al., "Wide-I/O 3D-Staked Dram Controller for Near-data Processing System", IEEE, 2017, 4 Pages.

* cited by examiner

FIG. 10

Table 1002:

| Physical address bit: | 33 | 32 | 31 | 30 | 29 | 28 | 27 | 26 | 25 | 24 | 23 | 22 | 21 | 20 | 19 | 18 |
|---|---|---|---|---|---|---|---|---|---|---|---|---|---|---|---|---|
| LPDDR address mapping I | Default RBC | D | | R17 | R16 | R15 | R14 | R13 | R12 | R11 | R10 | R9 | R8 | R7 | R6 | R5 | R4 | R3 |
| LPDDR address mapping II | Better for CAS Sync Mode | D | R17 | R16 | R15 | R14 | R13 | R12 | R11 | R10 | R9 | R8 | R7 | R6 | R5 | R4 | R3 |
| LPDDR address mapping III | II with refresh improvement | D | R17 | R16 | R15 | R14 | R13 | R12 | R11 | R10 | R9 | R8 | R7 | R6 | R5 | R4 | R3 |
| LPDDR address mapping IV | Better for free running mode | R0 | R17 | R16 | R15 | R14 | R13 | R12 | R11 | R10 | R9 | R8 | R7 | R6 | R5 | R4 | R3 |

Table 1004:

| Physical address bit: | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|
| LPDDR address mapping I | Default RBC | R2 | R1 | R0 | BA1 | BA0 | BG1 | BG0 | C5 | C4 | C3 | C2 | C1 | C0 | B3 | B2 | B1 | B0 | 0 |
| LPDDR address mapping II | Better for CAS Sync Mode | R2 | R1 | R0 | BA1 | BA0 | C2 | BG1 | C5 | C4 | C3 | BG0 | C1 | C0 | 0 | 0 | 0 | 0 | 0 |
| LPDDR address mapping III | II with refresh improvement | R2 | R1 | R0 | BA1 | BA0 | C2 | BG1 | C5 | C4 | C3 | BG0 | C1 | C0 | 0 | 0 | 0 | 0 | 0 |
| LPDDR address mapping IV | Better for free running mode | R2 | R1 | D | BA1 | BA0 | C2 | BG0 | C5 | C4 | C3 | BG1 | C1 | C0 | 0 | 0 | 0 | 0 | 0 |

RANK INTERLEAVING FOR SYSTEM META MODE OPERATIONS IN A DYNAMIC RANDOM ACCESS MEMORY (DRAM) MEMORY DEVICE

CROSS-REFERENCE TO RELATED APPLICATIONS

This application claims the benefit of U.S. Provisional Patent Application No. 63/505,997, entitled, "RANK INTERLEAVING FOR SYSTEM META MODE OPERATIONS IN A DYNAMIC RANDOM ACCESS MEMORY (DRAM) MEMORY DEVICE," filed on Jun. 2, 2023, which is expressly incorporated by reference herein in its entirety.

TECHNICAL FIELD

Aspects of the present disclosure relate generally to computer information systems, and more particularly, to memory systems for storing data. Some features may enable and provide improved memory capabilities for processing data and metadata stored in the same memory device.

INTRODUCTION

A computing device (e.g., a laptop, a mobile phone, etc.) may include one or several processors to perform various computing functions, such as telephony, wireless data access, and camera/video function, etc. A memory system is an important component of the computing device. The processors may be coupled to the memory system to perform the aforementioned computing functions. For example, the processors may fetch instructions from the memory system to perform the computing functions and/or to store within the memory system temporary data involved in performing these computing functions.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In some aspects, different types of information, such as data and metadata, may be stored in a same memory of the memory system in order to enhance efficiency of operation of a memory system. In particular, both data and associated metadata may be stored in a same row of a memory in a system meta mode. Furthermore, a memory system may include multiple ranks of memory for storing data and metadata, such as multiple blocks or divisions of the storage capacity of the memory. To facilitate efficient use of limited memory bandwidth, data access operations, such as operations to read data or metadata from and/or read and/or write metadata to multiple ranks of a memory system may be interleaved. Such interleaving may, for example, include initiating a first data access operation for a first rank and, subsequently, initiating a second data access operation for a second rank. Such interleaving may include performing at least a portion of a data access operation of a first rank of the memory system in parallel with at least a portion of a second data access operation of a second rank of a second rank of the memory system. In particular, operations to access metadata at one rank of the memory system may be performed in parallel with operations to access data at another rank of the memory system.

Particular implementations of the subject matter described in this disclosure may be implemented to realize one or more of the following potential advantages or benefits. Interleaving of data access operations for different ranks of a memory system may enhance an efficiency of usage of cache and bus capacity of the memory system. In some aspects, such interleaving may provide cache access efficiency of up to and exceeding eighty-six percent.

These aspects may be embodied as a sequence of commands transmitted from a host to a memory system. The commands transmitted by the host may include commands to read capabilities from the memory system, set configurations in the memory system, read data at one or more specified addresses from the memory system, and/or write data at one or more specified addresses to the memory system.

An apparatus in accordance with at least one embodiment includes a memory system configured to communicate with a host. The memory system may include one or more memory controllers configured to control a memory device. For example, the memory device may include a memory array configured to store data. The one or more memory controllers may be configured to provide the data stored in the memory array to the host for further processing by the processor or other components of the host. The one or more memory controllers may also be configured to receive data from the host for storage in the memory device, such as in the memory array. In some embodiments, the memory device may include a plurality of volatile memory cells organized in rows and columns, such as in a dynamic random access memory (DRAM) or static random access memory (SRAM). In other embodiments, the memory device may include a plurality of non-volatile memory cells or a mixture of volatile and non-volatile memory cells.

An apparatus in accordance with at least one other embodiment includes a host device with one or more memory controllers configured to communicate with a memory system to receive data stored in the memory array and/or to store data in the memory array. The host device may be, for example, a user equipment (UE) device such as a cellular phone, a tablet computing device, a personal computer, a server, a smart watch, or an internet of things (IoT) device.

In one aspect of the disclosure, a method for operating a memory device includes receiving, by the one or more memory controllers, a first request for a memory device and a second request for the memory device; executing, by the one or more memory controllers, the first request in a first rank of the memory device during a first time period, wherein the first time period comprises a first data access portion and a first metadata access portion; and executing, by the one or more memory controllers, the second request in a second rank of the memory device during a second time period, wherein the second time period comprises a second data access portion and a second metadata access portion, wherein executing the first request in the first rank and executing the second request in the second rank comprises interleaving the first request and the second request between the first rank and the second rank.

In an additional aspect of the disclosure, an apparatus includes at least one processor and a memory coupled to the at least one processor. The at least one processor is configured to receive and schedule operations for execution by a multi-rank memory device. The processor may be a processor, controller, or other logic circuitry in a host. The processor may alternatively be a controller embedded in a memory device. The processor is further configured to perform the operations described herein.

In an additional aspect of the disclosure, an apparatus includes means for receiving, by the one or more memory controllers, a first request for a memory device and a second request for the memory device; means for executing, by the one or more memory controllers, the first request in a first rank of the memory device during a first time period, wherein the first time period comprises a first data access portion and a first metadata access portion; and means for executing, by the one or more memory controllers, the second request in a second rank of the memory device during a second time period, wherein the second time period comprises a second data access portion and a second metadata access portion, wherein executing the first request in the first rank and executing the second request in the second rank comprises interleaving the first request and the second request between the first rank and the second rank.

In an additional aspect of the disclosure, an apparatus includes one or more memory controllers of a memory system. The one or more memory controllers are configured to perform operations including receiving, by the one or more memory controllers, a first request for a memory device and a second request for the memory device, executing, by the one or more memory controllers, the first request in a first rank of the memory device during a first time period, wherein the first time period comprises a first data access portion and a first metadata access portion, and executing, by the one or more memory controllers, the second request in a second rank of the memory device during a second time period, wherein the second time period comprises a second data access portion and a second metadata access portion, wherein executing the first request in the first rank and executing the second request in the second rank comprises interleaving the first request and the second request between the first rank and the second rank.

In an additional aspect of the disclosure, an apparatus includes a host device configured to communicate with a memory module through a channel. The host device includes one or more memory controllers coupled to the channel. The one or more memory controllers are configured to perform operations including receiving, by the one or more memory controllers, a first request for a memory device and a second request for the memory device, executing, by the one or more memory controllers, the first request in a first rank of the memory device during a first time period, wherein the first time period comprises a first data access portion and a first metadata access portion, and executing, by the one or more memory controllers, the second request in a second rank of the memory device during a second time period, wherein the second time period comprises a second data access portion and a second metadata access portion, wherein executing the first request in the first rank and executing the second request in the second rank comprises interleaving the first request and the second request between the first rank and the second rank.

An apparatus in accordance with at least one embodiment includes a memory configured to communicate with a host. The memory may include a memory array configured to store data. The memory is configured to provide the data stored in the memory array to the host in performing computing functions. In some aspects, registers of a memory device may be configured to separately store data and metadata in different sets of registers. The metadata registers may temporarily store information during transmission between a host device and a memory device for retrieval from a memory array of the memory device in response to a read command or storage in the memory array of the memory device in response to a write command.

In one aspect of the disclosure, a memory device includes a memory array comprising a first portion and a second portion; and a memory input/output (I/O) module. The memory I/O module may be coupled to the memory array, configured to communicate with a host through a channel comprising a plurality of connections including at least one data connection and at least one non-data connection, and comprised of at least one first register and at least one second register. The memory I/O module may be configured to perform operations including receiving data from the host via the at least one data connection into the at least one first register; receiving metadata from the host via the at least one non-data connection into the at least one second register; storing the data in the first portion of the memory array; and storing the metadata in the second portion of the memory array. The memory I/O module may also be configured to perform operations including retrieving data from the first portion of the memory array into the at least one first register; retrieving metadata from the second portion of the memory array into the at least one second register; transmitting the data to the host via the at least one data connection from the at least one first register; and transmitting the metadata to the host via the at least one non-data connection from the at least one second register.

In an additional aspect of the disclosure, an apparatus, such as a wireless device, includes at least one processor and a memory coupled to the at least one processor. The at least one processor is configured to communicate with the memory system through a one or more memory controllers coupled to a channel that couples the processor to the memory system. The processor may be a processor, controller, or other logic circuitry in a host.

In an additional aspect of the disclosure, a non-transitory computer-readable medium stores instructions that, when executed by a processor, cause the processor to perform operations described herein regarding aspects of the disclosure.

Memory systems in the present disclosure may be embedded within a processor on a semiconductor die or be part of a different semiconductor die. The memory systems may be of various kinds. For example, the memory may be static random access memory (SRAM), dynamic random access memory (DRAM), magnetic random access memory (MRAM), NAND flash, or NOR flash, etc.

Methods and apparatuses are presented in the present disclosure by way of non-limiting examples of Low-Power Double Data Rate (LPDDR) Synchronous Dynamic Random Access Memory (SDRAM). For example, the LPDDR memory operating in accordance with LPDDR specification promulgated by Joint Electronic Device Engineering Council (JEDEC). One such LPDDR specification may be LPDDR5. Another such LPDDR specification may be LPDDR6.

The term error-correcting code or codes (ECC or ECCs) in the present disclosure may refer to error detection, error correcting, or error detection and correcting codes. The ECCs are not be limited to a particular type of coding. In some examples, the ECCs may include Hamming codes and/or parity codes.

Other aspects, features, and implementations will become apparent to those of ordinary skill in the art, upon reviewing the following description of specific, exemplary aspects in conjunction with the accompanying figures. While features may be discussed relative to certain aspects and figures below, various aspects may include one or more of the advantageous features discussed herein. In other words, while one or more aspects may be discussed as having certain advantageous features, one or more of such features may also be used in accordance with the various aspects. In similar fashion, while exemplary aspects may be discussed below as device, system, or method aspects, the exemplary aspects may be implemented in various devices, systems, and methods.

The method may be embedded in a computer-readable medium as computer program code comprising instructions that cause a processor to perform the steps of the method. In some embodiments, the processor may be part of a mobile device including a first network adaptor configured to transmit data, such as images or videos in a recording or as streaming data, over a first network connection of a plurality of network connections. The processor may be coupled to the first network adaptor and a memory for storing data to support the processing and communications operations performed by the processor. The network adaptor may support communication over a wireless communications network such as a 5G NR communication network. The processor may cause the transmission of data stored in memory over the wireless communication network.

The foregoing has outlined, rather broadly, the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, aspects and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described aspects. For example, transmission and reception of wireless signals necessarily includes a number of components for analog and digital purposes (e.g., hardware components including antenna, radio frequency (RF)-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

FIG. 10 is a table illustrating an LPDDR address bit mapping example according to one or more aspects of the disclosure.

FIG. 11B is a second portion of a table of hashing for address mapping according to one or more aspects of the disclosure

Like reference numbers and designations in the various drawings indicate like elements.

DETAILED DESCRIPTION

Figure 1:
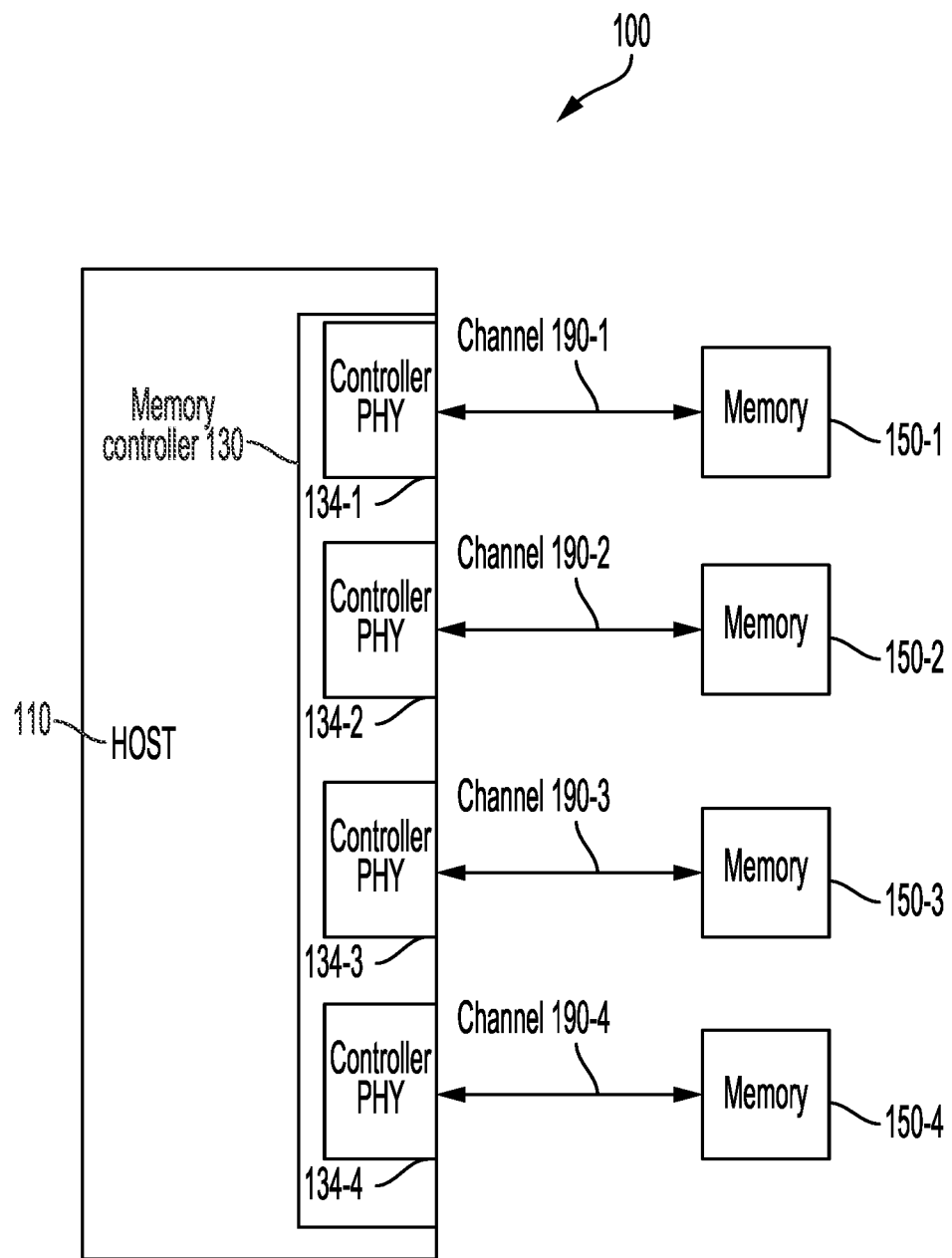
FIG. 1 shows a block diagram of an example computing system incorporating a host, memory system, and channels coupling the host and the memory system according to one or more aspects of the disclosure.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

The present disclosure provides systems, apparatus, methods, and computer-readable media that support data processing, including techniques for supporting communication of data between a host and a memory device. The host may transmit data and accompanying metadata for storage in a memory array of the memory device. The memory device may include registers for receiving a copy of the metadata stored in the memory array prior to transmitting data and associated metadata to the host in response to a read command and accumulating the metadata sent by the host with data for writing to the memory array. Metadata registers of the memory device may be organized to associate metadata with the data without using two separate addresses for the data and metadata. Examples of metadata for storage with the data include error correction codes (ECCs) to protect the data from errors and/or signatures to protect the data from tampering. Metadata may, however, be used for more than protection of the data. To enhance efficiency and reduce cost of memory systems, both data and metadata may be stored in a same memory array of a memory system in a system meta mode. In some aspects, data and metadata may be stored in a same row, or page, of a memory array of the memory system, with a portion of the row, or page, allocated for data storage and a portion of the row, or page, allocated for metadata storage. Accessing metadata stored in a same row, or page, of a memory as data may reduce an amount of memory bandwidth available for reading and/or writing data, as metadata access operations may utilize bandwidth that would otherwise be available for reading data from and/or writing data to the memory. In some cases, 20-30% of memory utilization may be lost, with only an approximate maximum of 55% of DDR bandwidth being used for reading and writing data. Such reductions in efficiency may be attributed, at least in part, to metadata write operations being primarily partial writes, which may utilize a substantial portion of read/write bandwidth of the memory device including the memory array. To facilitate more efficient reading and writing of data and metadata from memories configured in a system meta mode, metadata and data may be read from the memory array or written to the memory array by interleaving operations between ranks of the memory device to reduce the overhead associated with reading and/or writing additional metadata bits into the memory array.

Particular implementations of the subject matter described in this disclosure may be implemented to realize one or more of the following potential advantages or benefits. In some aspects, the present disclosure provides a reduction in overhead by allowing metadata operations in one rank of the memory device to overlap data operations in another rank of the memory device. Such reduction may enhance an efficiency of operation of memory devices, allowing for data and metadata to be more rapidly read and written.

As demands grow for the computing device to perform more functions with increasing speed, errors with data stored in a memory may grow as well. Errors may grow as data stored in memories and transferred between blocks increases. One example of protecting from such errors is the use of error correction codes (ECCs) associated with data. Schemes to improve error detection/correction in accessing a memory, without overburdening a host or the memory, are advantageous to improve system performance. ECC may be attached during transmission over channels, such as with link ECC. ECC may also be attached for storage into the memory array, such as with system ECC. In some examples, end-to-end system ECC may be implemented in a host by adding large density on-chip SRAM to store in-line ECC parity bits for certain data to enhance overall data reliability. However, such high-density on-chip SRAM is very expensive in terms of overall system cost, and high-density SRAM is susceptible to soft errors associated with SRAM cells. ECC data is one example of metadata that may be stored with data in one or more ranks of a memory system.

An example memory device that may incorporate aspects of this disclosure, including performing transactions (e.g., read operations and/or write operations) in multiple ranks of a memory device in an interleaved manner to reduce the impact of accessing metadata, is shown in FIG. 1. FIG. 1 illustrates an apparatus 100 incorporating a host 110, memories 150, and channels 190 coupling the host 110 and the memories 150. The apparatus 100 may be, for example, a device among computing systems (e.g., servers, datacenters, desktop computers), mobile computing device (e.g., laptops, cell phones, vehicles, etc.), Internet of Things devices, virtual reality (VR) systems, augmented reality (AR) systems, automobile systems (e.g., driver assistance systems, autonomous driving systems), image capture devices (e.g., stand-alone digital cameras or digital video camcorders, camera-equipped wireless communication device handsets, such as mobile telephones, cellular or satellite radio telephones, personal digital assistants (PDAs), panels or tablets, gaming devices, computing devices such as webcams, video surveillance cameras, or other devices with digital imaging or video capabilities), and/or multimedia systems (e.g., televisions, disc players, streaming devices).

The host 110 may include at least one processor, such as central processing unit (CPU), graphic processing unit (GPU), digital signal processor (DSP), multimedia engine, and/or neural processing unit (NPU). The host 110 may be configured to couple and to communicate to the memories 150 (e.g., memories 150-1 to 150-4), via channels 190 (e.g., channels 190-1 to 190-4), in performing the computing functions, such as one of data processing, data communication, graphic display, camera, AR or VR rendering, image processing, neural processing, etc. For example, the memories 150-1 to 150-4 may store instructions or data for the host to perform the computing functions.

The host 110 may include a memory controller 130, which may include controller PHY modules 134-1 to 134-4. Each of the controller PHY modules 134-1 to 134-4 may be coupled to a respective one of the memories 150-1 to 150-4 via respective channels 190-1 to 190-4. In some embodiments, each of the controller PHY modules 134-1 to 134-4 may be different memory controllers 130-1 to 130-4, respectively. For ease of reference, read and write are referenced from a perspective of the host 110. For example, in a read operation, the host 110 may receive via one or more of the channels 190-1-190-4 data stored from one or more of the memories 150-1 to 150-4. In a write operation, the host 110 may provide via one or more of the channels 190-1-190-4 data to be written into one or more of the memories 150-1-150-4 for storage. The memory controller 130 may be configured to control various aspects, such as logic layers, of communications to and from the memories 150-1-150-4. The controller PHY modules 134-1-134-4 may be configured to control electrical characteristics (e.g., voltage levels, phase, delays, frequencies, etc.) of signals provided or received on the channels 190-1-190-4, respectively.

In some examples, the memories 150-1-150-4 may be LPDDR DRAM (e.g., LPDDR5, LPDDR6). In some examples, the memories 150-1-150-4 may be different kinds of memory, such as one LPDDR5, one LPDDR6, one Flash memory, and one SRAM, respectively. The host 110, the memories 150-1-150-4, and/or the channels 190-1-190-4 may operate according to an LPDDR (e.g., LPDDR5, LPDDR6) specification. In some examples, each of the channels 190-1-190-4 may include 16 bits of data (e.g., 16 DQs). In some examples, each of the channels 190-1-190-4 may operate on 32 bits of data (e.g., 32 DQs). In FIG. 1, four channels are shown, however the apparatus 100 may include more or less channels, such as 8 or 16 channels.

Figure 2:
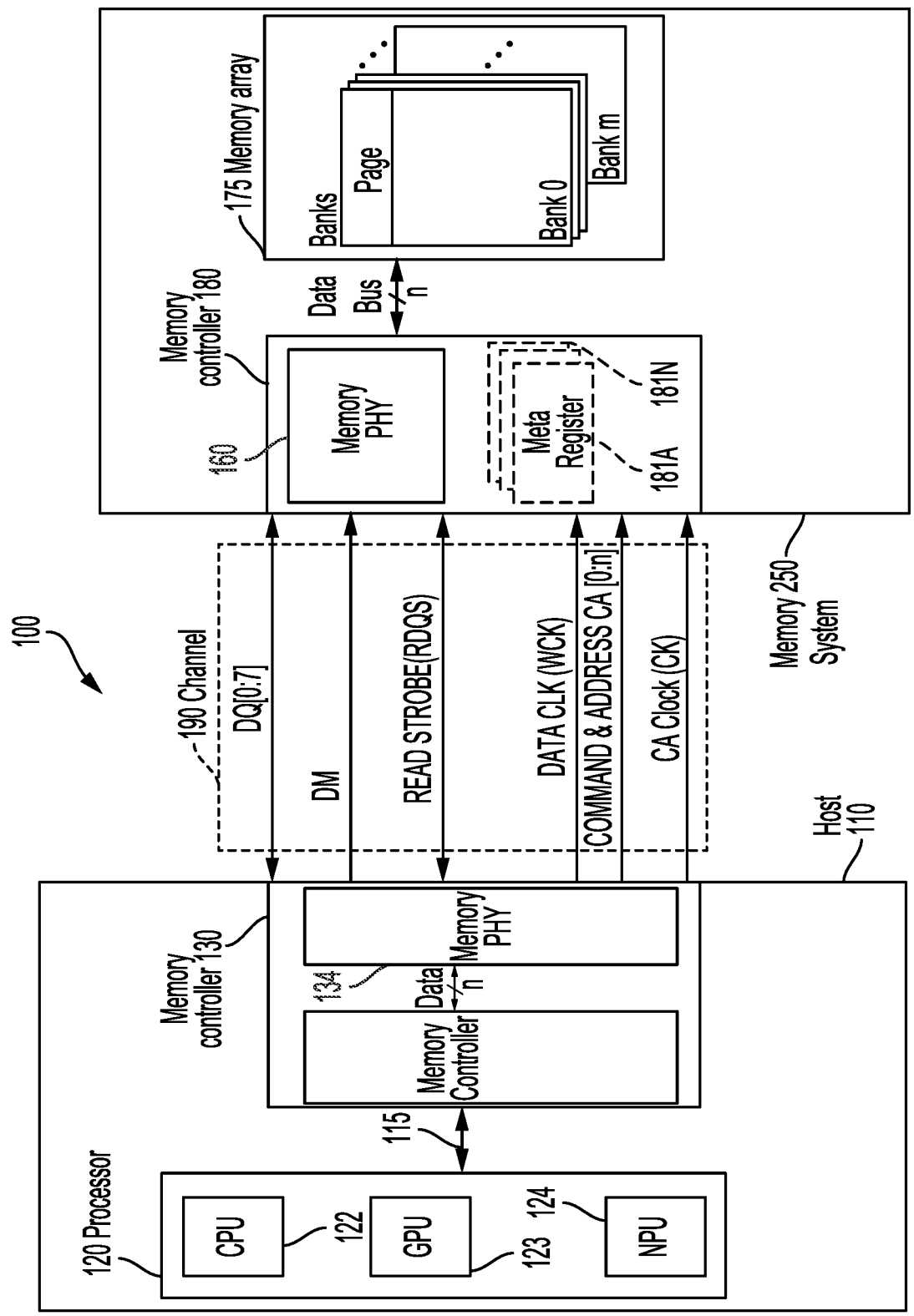
FIG. 2 shows a block diagram of an example computing system incorporating a host, memory system, and channels coupling the host and the memory system with another implementation of the channels according to one or more aspects of the disclosure.

Additional details of an aspect of the embodiment of the apparatus 100 for providing access to a memory system (such as one of memories 150-1-150-4 including logic and control circuit) are shown in FIG. 2. FIG. 2 illustrates a configuration of the host 110, a memory system 250 FIG. 2 illustrates another representation of the apparatus 100 having the host 110, the memory system 250, and the channel 190 of FIG. 1. The channel 190 between host 110 and the memory system 250 may include a plurality of connections, some of which carry data (e.g., user data or application data) and some of which carry non-data (e.g., addresses and other signaling information). For example, non-data connections in channel 190 may include a data clock (e.g., WCK) used in providing data to the respective memory system 250 and a read data strobe (e.g., RDQS) used in receiving data from the respective memory system 250, on a per byte basis. The channel 190 may further include command and address (e.g., CA[0:n]) and associated CA clock to provide commands (e.g., read or write commands) to the memory system 250.

The host 110 may include at least one processor 120, which may include a CPU 122, a GPU 123, and/or an NPU 124. The host 110 may further include a memory controller 130 having a controller PHY module 134. The memory controller 130 may couple to the at least one processor 120 via a bus system 115 in performing the various computing functions. The term "bus system" may provide that elements coupled to the "bus system" may exchange information therebetween, directly or indirectly. In different embodiments, the "bus system" may encompass multiple physical connections as well as intervening stages such as buffers, latches, registers, etc. A module may be implemented in hardware, software, or a combination of hardware and software.

The memory controller 130 may send and/or receive blocks of data to other modules, such as the at least one processor 120 and/or the memory system 250. The memory system 250 may include a memory controller 180 with a memory I/O module 160 (e.g., a PHY layer) configured to control electrical characteristics (e.g., voltage levels, phase, delays, frequencies, etc.) to provide or to receive signals on connections of the channel 190. For example, memory I/O module 160 may be configured to capture (e.g., to sample) data, commands, and addresses from the host 110 via the channel 190 and to output data to the host 110 via the channel 190. Example techniques for communicating on the channel 190 between the memory I/O module 160 and the memory controller 130 are shown in the examples of FIG. 3A, FIG. 3B, FIG. 4A, and FIG. 4B.

The memory system 250 may further include a memory array 175, which may include multiple memory cells (e.g., DRAM memory cells, MRAM memory cells, SRAM memory cells, Flash memory cells) that store values. The host 110 may read data stored in the memory array 175 and write data into the memory array 175, via the channel 190 and the memory I/O module 160. The memory array 175 may be divided into a plurality of banks with each bank organized as a plurality of pages. In some aspects, the memory array 175 may be divided into a plurality of ranks. For example, each rank may include one or more banks, with each bank including one or more pages.

Application or user data may be processed by the processor 120 and the memory controller 130 instructed to store and/or retrieve such data from the memory system 250. For example, data may be generated during the execution of an application, such as a spreadsheet program that computes values based on other data. As another example, data may be generated during the execution of an application by receiving user input to, for example, a spreadsheet program. As a further example, data may be generated during the execution of a gaming application, which generates information regarding a representation of a scene rendered by a three-dimensional (3-D) application.

The host 110 is coupled to the memory system 250 via the channel 190, which is illustrated for a byte of data, DQ[0:7]. The channel 190 and signaling between the host 110 and the memory system 250 may be implemented in accordance with the JEDEC DRAM specification (e.g., LPDDR5, LPDDR6). As illustrated, the channel 190 includes signal connections of the DQs, a read data strobe (RDQS), a data mask (DM), a data clock (WCK), command and address (CA[0:n]), and command and address clock (CK). The host 110 may use the read data strobe RDQS to strobe (e.g., to clock) data in a read operation to receive the data on the DQs. The memory system 250 may use the data mask DM to mask certain parts of the data from being written in a write operation. The memory system 250 may use the data clock WCK to sample data on the DQs for a write operation. The memory system 250 may use the command and address clock CK to clock (e.g., to receive) the CAs. A signal connection for each of the signaling may include a pin at the host 110, a pin at the memory system 250, and a conductive trace or traces electrically connecting the pins. The conductive trace or traces may be part of a single integrated circuit (IC) on a silicon chip containing the processor 120 and the memory system 250, may be part of a package on package (POP) containing the processor 120 and the memory system 250, or may be part of a printed circuit board (PCB) coupled to both the processor 120 and the memory system 250. In some aspects, a channel 190 between a host 110 and a memory system 250 may include 12 DQ pins, for twelve bits of data DQ[11:0] and no DM pins. Both data and metadata may be transferred on DQ pins, for thirty-two bytes of data and four bytes of metadata in 24 beats (24BL). In some cases, such as when ECC metadata is being transferred via the channel 190, only two bytes of the four available bytes may be transferred, as ECC may include 2 bytes of metadata per 32 bytes of data.

The memory system 250 may include a memory I/O module 160 (e.g., a PHY layer) configured to control electrical characteristics (e.g., voltage levels, phase, delays, frequencies, etc.) to provide or to receive signals on the channel 190. For example, memory I/O module 160 may be configured to capture (e.g., to sample) data, commands, and addresses from the host 110 via the channel 190 and to output data to the host 110 via the channel 190.

Figure 5A:
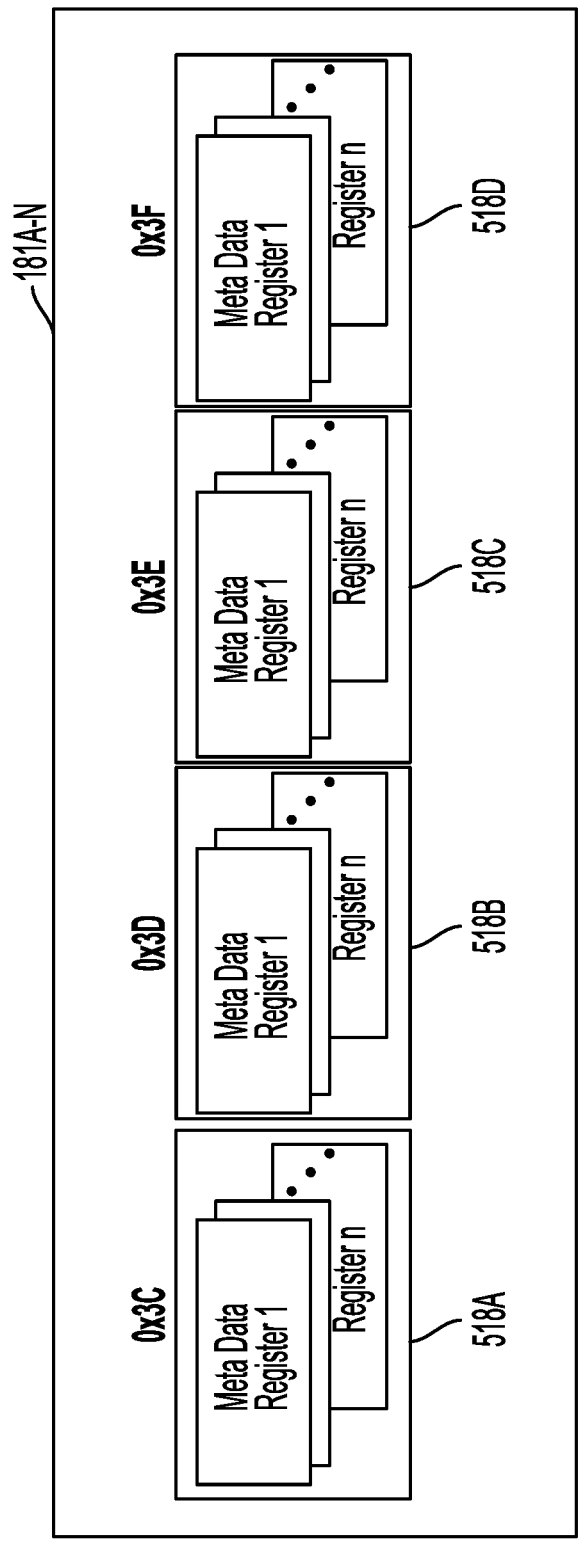
FIG. 5A is a block diagram illustrating an example configuration for metadata registers according to one or more aspects of the disclosure.
Figure 5B:
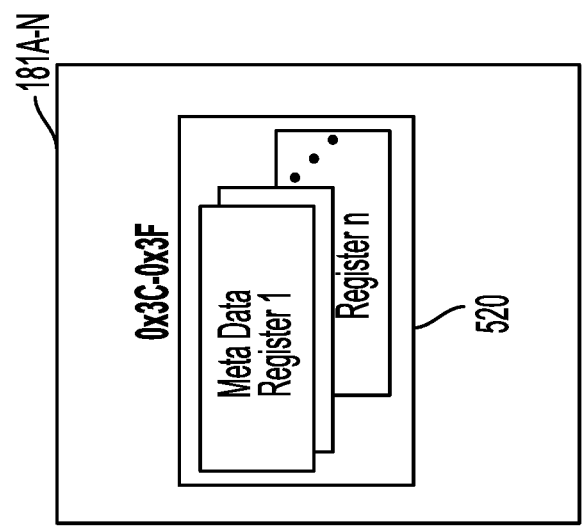
FIG. 5B is a block diagram illustrating an example configuration for metadata registers according to one or more aspects of the disclosure.
Figure 6:
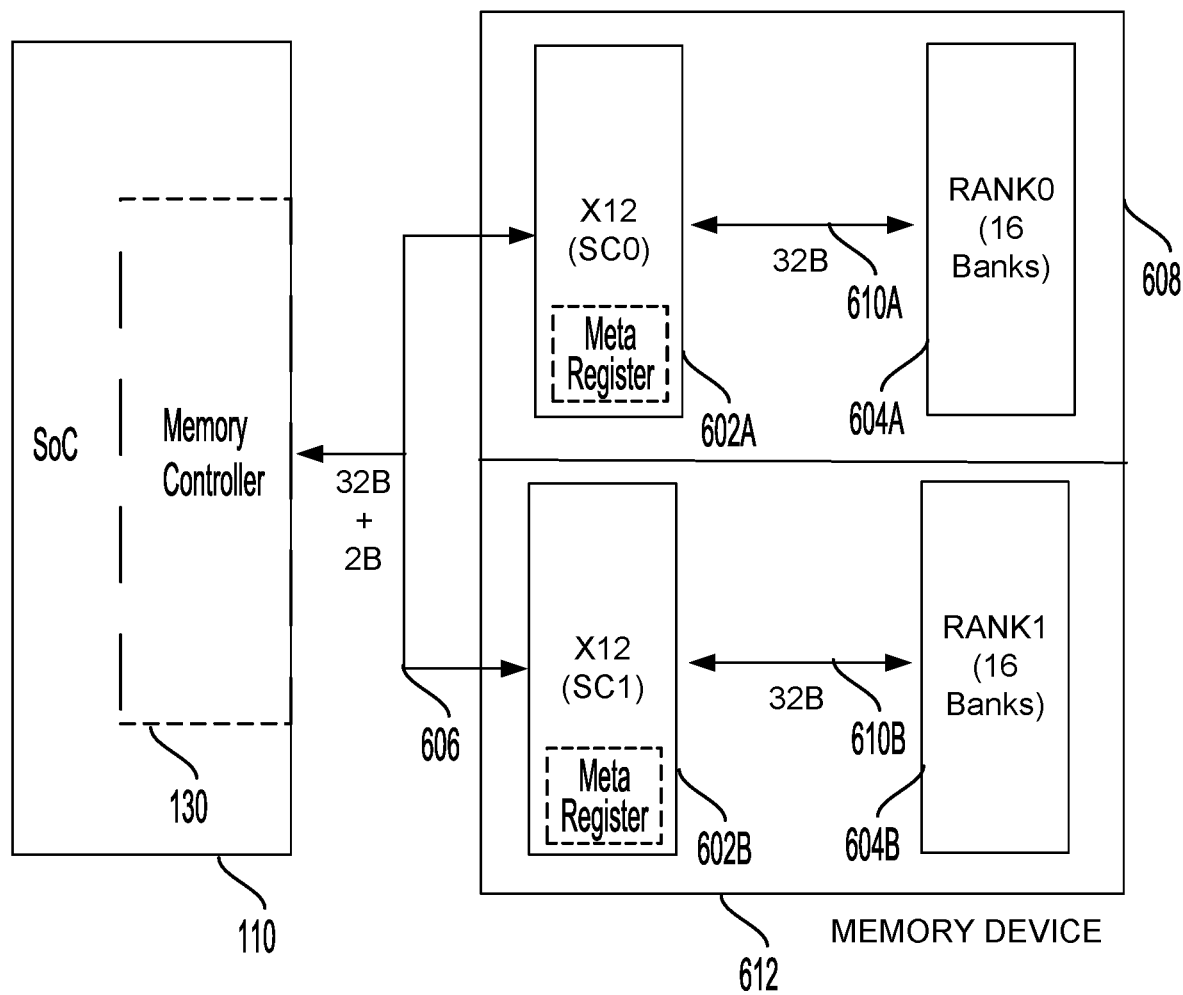
FIG. 6 is a block diagram illustrating a multiple-rank configuration for a memory device coupled to a memory controller according to one or more aspects of the disclosure.

Information transmitted across the channel 190 may be stored in registers in the memory I/O module 160 of the memory 150 as a temporary or short-term storage location prior to longer-term storage in the memory array 175. The memory I/O module 160 may include first and second registers for storing the data (e.g., user data or application data) and metadata, respectively. As one example, a plurality of metadata registers 181A-N may store the metadata. The contents of registers 181A-N may then be transferred to memory array 175. In some embodiments, the contents of registers 181A-N may be transferred shortly after receipt in a serial manner to complete individual write commands. In some embodiments, the contents of registers 181A-N may be accumulated from multiple write commands received at the memory 150 and the metadata transferred to the memory array 175 when certain criteria are met. The data is then written to the first portion of the memory array automatically without any additional write commands from the host. Some example configurations for the metadata registers 181A-N are shown in FIGS. 5A-B and FIG. 6.

The metadata registers 181A-N may be associated with memory addresses of the memory array 175 according to different techniques. One example memory address mapping is shown in FIG. 5A. Certain addresses in a page may be assigned for metadata, such as by carving-out column space corresponding to 0x3C-0x3F. The metadata registers 181A-N may include n metadata registers dedicated to each column location, and each one of the n registers dedicated to each column location may be dedicated to one of n banks. That is, column space 0x3C has a first set 518A of n meta data registers, column space 0x3D has a second set 518B of n metadata registers, column space 0x3E has a third set 518C of n meta data registers, and column space 0x3F has a fourth set 518D of n metadata registers. The metadata registers 181A-N may have a total of 4n registers in this example configuration. In another example, shown in FIG. 5B, the metadata registers 181A-N may include a single register per bank, totaling n registers for n banks. Thus, the metadata registers 181A-N may include a single set of metadata registers 520, and the column spaces 0x3C-0x3F may be associated with the single set of n metadata registers 520 rather than with separate sets of metadata registers per each column space. Use of a single set of metadata registers for column spaces 0x3C-0x3F may reduce a memory die size overhead through use of a single metadata register per bank.

Returning to FIG. 2, the memory system 250 may further include a memory array 175, which may include multiple memory cells (e.g., DRAM memory cells) that store information. For example, each page of each bank of the memory array 175 may include multiple cells. The host 110 may read data stored in the memory array 175 and write data into the memory array 175 via the channel 190. Moreover, the memory array 175 may be configured to store metadata such as ECCs (e.g., system or array ECCs) associated with the stored data.

Operations according to some embodiments of this disclosure for storing and retrieving information from memory array 175 may be performed by controlling signals on individual lines of the channel 190. Example embodiments of signaling for a write operation are shown and described with reference to FIG. 3A and FIG. 3B. Example embodiments of signaling for a read operation are shown and described with reference to FIG. 4A and FIG. 4B.

Figure 3A:
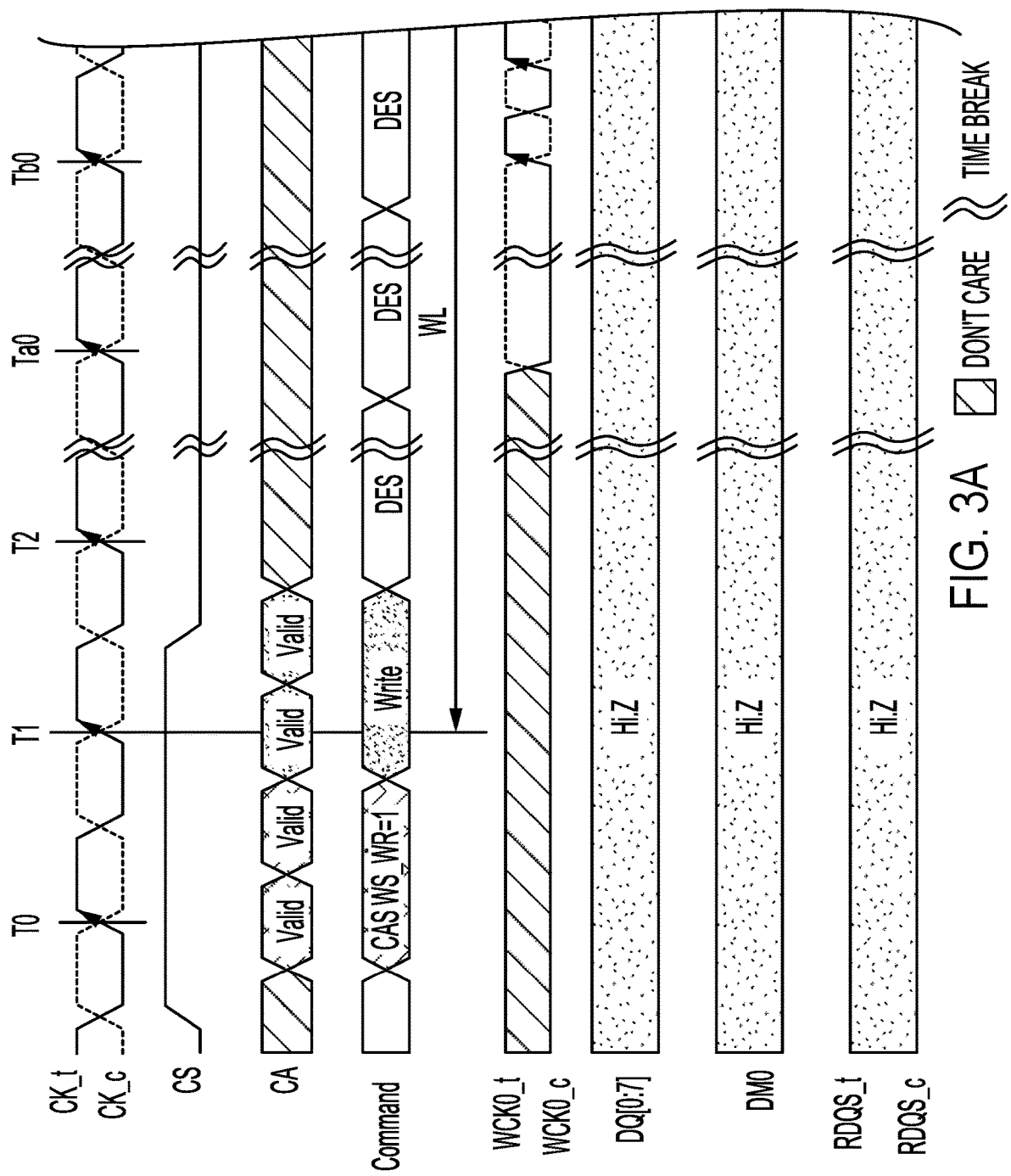
FIGS. 3A and FIG. 3B illustrate waveforms for transfer of data through an example channel in a write operation in accordance with certain aspects of the present disclosure.
Figure 3B:
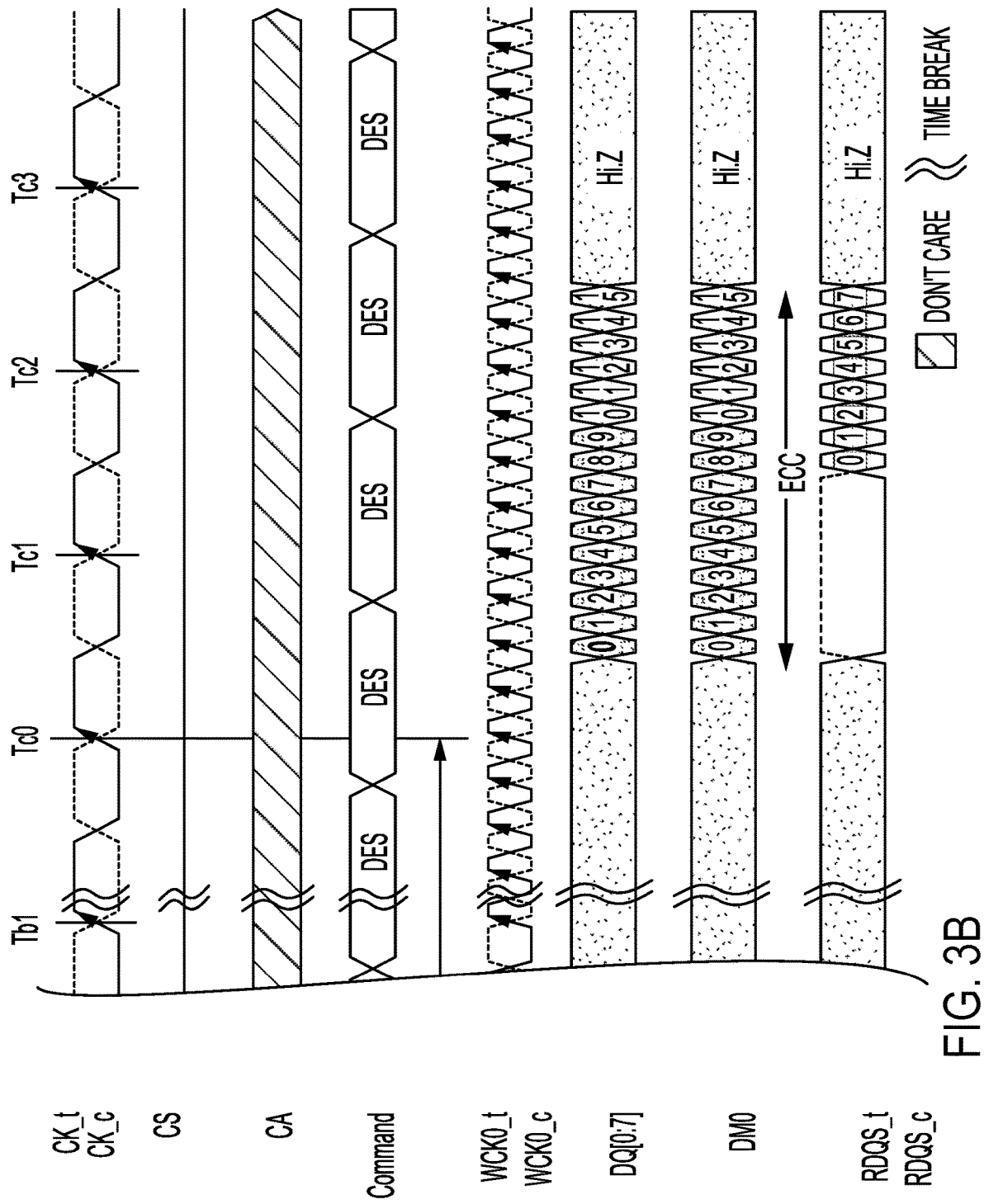

FIG. 3A and FIG. 3B illustrate waveforms of transfer of data through an example channel in a write operation in accordance with certain aspects of the present disclosure. The command and address clock, CK, may be a differential signal having CK_t and CK_c signal connections. The data clock WCK may be a differential signal having WCK0_t and WCK0_c signal connections. The read data strobe RDQS may be a differential signal having RDQS_t and RDQS_c signal connections. The data mask is labeled DM0 to indicate that DM0 corresponds to a lower byte of DQs (DQ[0: 7]). At T0 (rising edge of CK_c and falling edge of CK_t), a CAS command may be provided by the host 110 for a write operation to the memory system 250. At T1, a write command may be provided by the host 110 to the memory system 250.

After a time period write latency (WL), the host 110 may toggle the data clock WCK0_t and WCK0_c to provide the memory system 250 with clocking for receiving data for write, on the DQ signal connections. At Tc0-Tc2, the memory system 250 may receive 16 bytes of data serially, on each of the DQ[0:7] signal connections and clocked by the data clock WCK0_t and WCK0_c. The memory system 250 may receive 16 bits of the data mask DM0 serially (e.g., based on the data clock WCK0_t and WCK0_c) to mask certain portions of the received data from the write operation. In some examples, the 16 bytes of data and 16 bits of the data mask DM0 may be received by the memory system 250, with each bit of the data mask DM0 masking a corresponding byte of the received data. At Tc0-Tc2, the RDQS_t signal connection may be a Hi-Z condition. In a read operation, the RDQS_t signal connection may be configured to provide a read data strobe (RDQS) from the memory system 250 to the host 110.

Figure 4A:
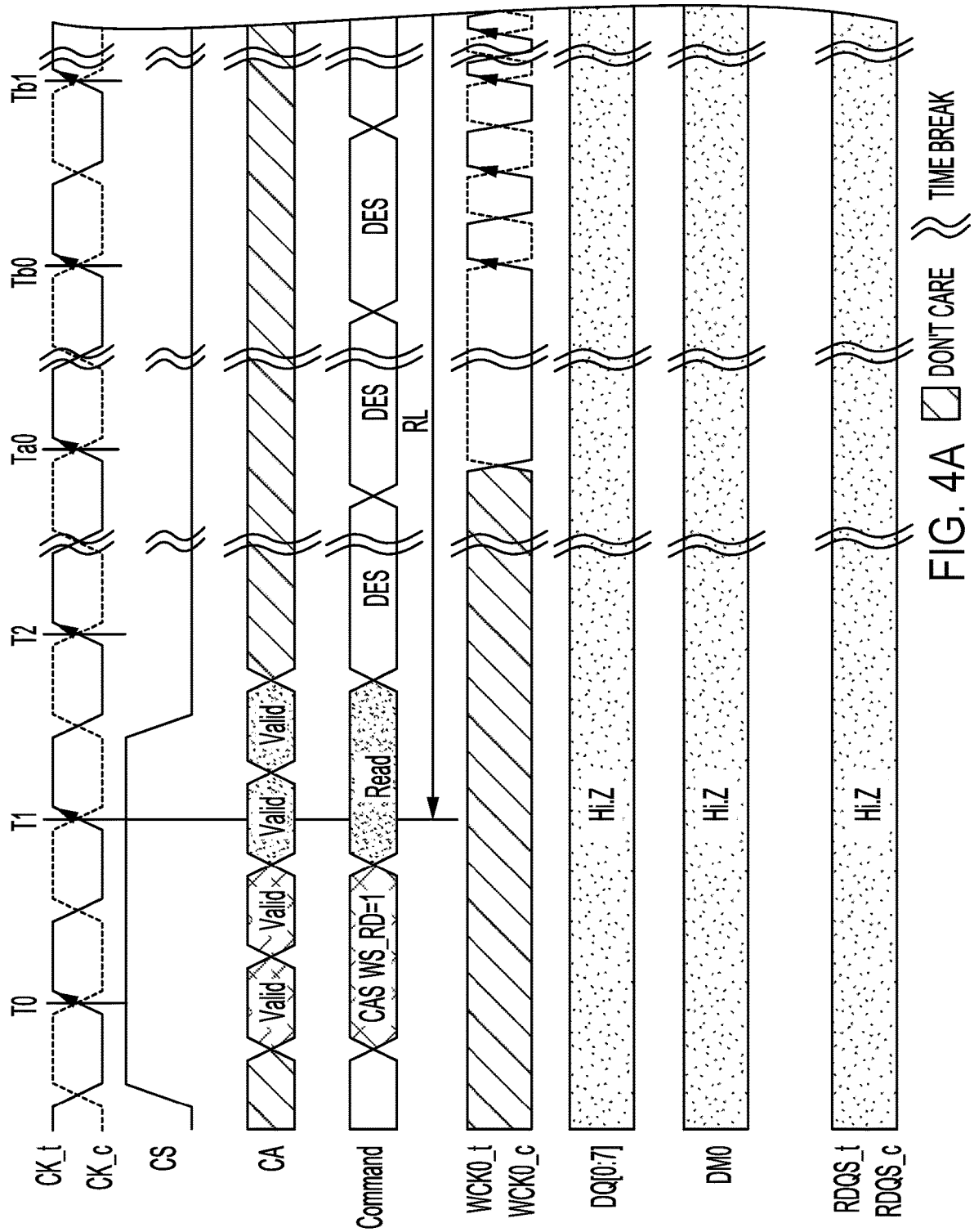
FIGS. 4A and FIG. 4B illustrate waveforms for transfer of data through an example channel in a read operation in accordance with certain aspects of the present disclosure.
Figure 4B:
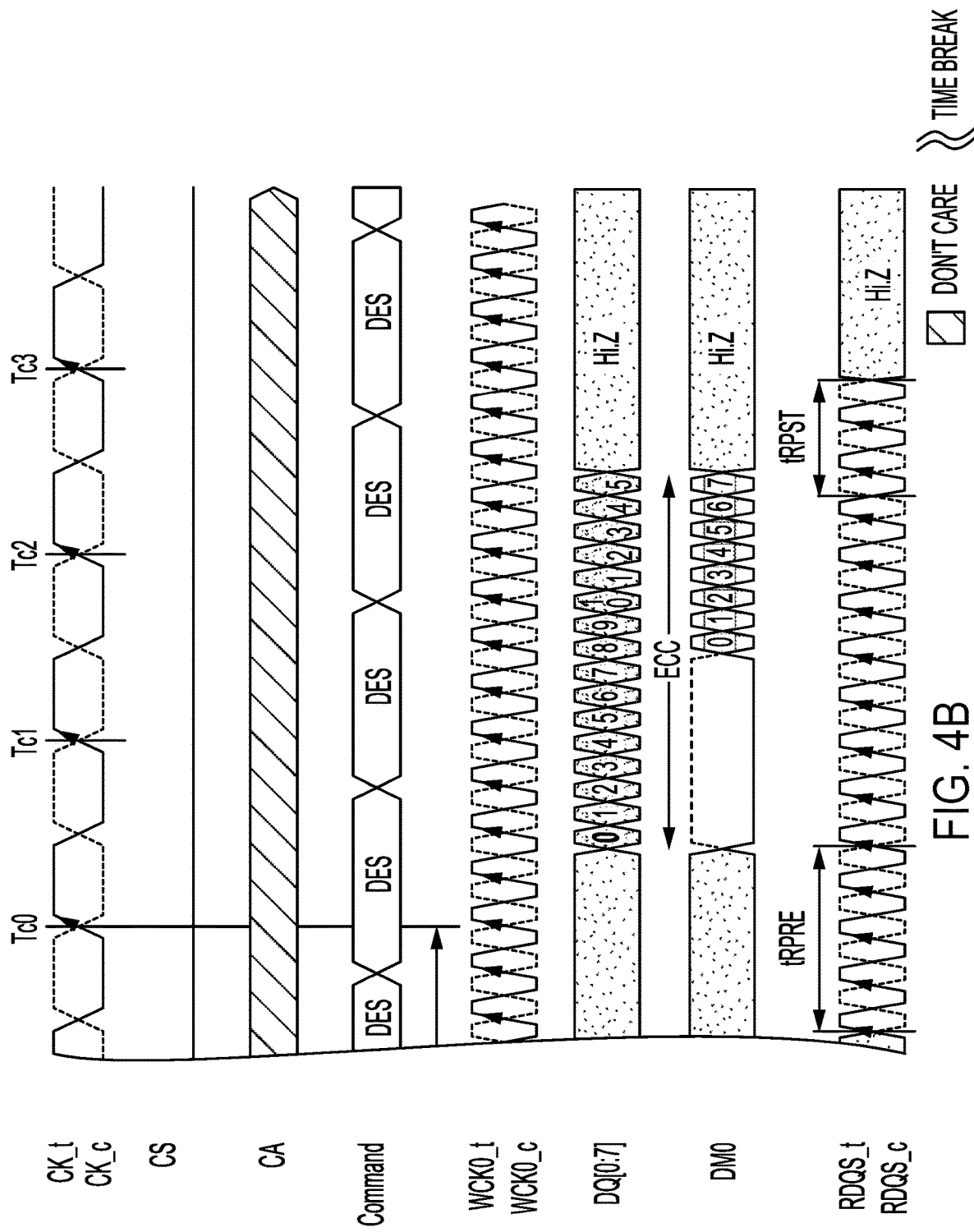

FIG. 4A and FIG. 4B illustrate waveforms for transfer of data through an example channel in a read operation in accordance with certain aspects of the present disclosure. The command and address clock, CK, may be a differential signal having CK_t and CK_c signal connections. The data clock WCK may be a differential signal having WCK0_t and WCK0_c signal connections. The read data strobe RDQS may be a differential signal having RDQS_t and RDQS_c signal connections. The data mask is labeled DM0 to indicate that DM0 corresponds to a lower byte of DQs (DQ[0: 7]). At T0 (rising edge of CK_c and falling edge of CK_t), a CAS command may be provided by the host 110 for a read operation to the memory system 250. At T1, a read command may be provided by the host 110 to the memory system 250.

After a time period read latency (RL), the memory system 250 may toggle the read data strobe RDQS to provide the host 110 with clocking to receive data for the read operation on the DQ signal connections. At Tc0-Tc2, the host 110 may receive 16 bytes of data serially, on each of the DQ[0:7] signal connections and clocked by the read data strobe RDQS_t and RDQS_c. Thus, in the example, 16 bytes of data are received by the host 110.

At Tc0-Tc2, the data mask DM0 signal connection may be in a Hi-Z condition. In a write operation, the DM signal connection may be configured to provide a data mask from the host 110 to the memory system 250, which is clocked by WCK0_t and WCK0_c.

FIG. 6 is a block diagram illustrating a multiple-rank configuration for a memory device coupled to a memory controller according to one or more aspects of the disclosure. A system-on-chip (SoC) may be the host device 110 for coupling with memory devices 150-1, 150-2. In some aspects, each of memory devices 150-1, 150-2 may correspond to a rank of a memory system. Different memory devices 150-1, 150-2 may share bus lines, such as data lines and address lines. In some embodiments, a multi rank configuration may include a bus interface, such as bus interface 606, to the SoC that is shared. In some embodiments, a memory system may include one die per rank, while in other embodiments a memory system may include a single die with multiple ranks. A memory rank may, for example, be a block or grouping of data storage units in a memory device. For example, each rank may include one or more DRAM units in a memory module. In some aspects, each rank may include multiple memory banks of a memory device. Thus, for example, a memory device 608, 612 may include a memory array including a first rank 604A and a second rank 604B, and each rank may correspond to a sub-array of the memory array. Referring to FIG. 6, a memory device may include multiple dies, such as a first die 608 and a second die 612. The first die 608 may include a first memory rank 604A, such as a first memory array corresponding to the first memory rank 604A. The second die 612 may include a second memory rank 604B, such as a second memory array corresponding to the second memory rank 604A. In some aspects, the first memory rank 604A and the second memory rank 604B may be included on a single memory die of the memory device. The first and second memory dies 608, 612 may be connected to the host 110 via a shared bus 606. A first memory rank 604A may correspond to a first memory array including 16 memory banks, and the second memory rank 604B may correspond to a second memory array including 16 memory banks. For example, the first die 608 of the memory device may include a first memory rank 604A, which may correspond to memory device 150-1 of FIG. 1. The second die 612 of the memory device may include a second memory rank 604B, which may correspond to memory device 150-2 of FIG. 1. The memory ranks, such as memory ranks 604A and 604B, may have different chip select (CS) lines to allow the memory controller 130 to specifically address each rank 604A and 604B. Each memory die 608, 612 may also include logic circuitry to support performing operations on the memory arrays corresponding to the first memory rank 604A and the second memory rank 604B by the memory controller 130. For example, logic circuitry 602A-B may control corresponding memory array ranks 604A-B. In some aspects, logic circuitry 602A-B and memory ranks 604A-B may be located on a single die. In some embodiments, separate metadata registers may be present for each rank 604A-B to separately buffer metadata (e.g., ECC) from data buffered from the corresponding memory rank. Thus, for example, first logic 602A may include one or more metadata registers for buffering metadata from the first rank 604A, and second logic 602B may include one or more metadata registers for buffering metadata from the second rank 604B. The first logic 602A may be connected to the first rank 604A via a first internal bus 610A, and the second logic 602B may be connected to the second rank 604B via a second internal bus 602B. The memory device of FIG. 6 including the first die 608 and the second die 612 may be configured to operate in a system meta mode in which a portion of the ranks, such as a portion of each row of one or more memory arrays associated with the ranks, is allocated for storage of metadata and a portion of the ranks, such as a portion of each row of the one or more memory arrays associated with the ranks, is allocated for storage of data. Thus, as shown in FIG. 6, associated data and metadata may be read from or written to each of the memory array ranks 604A-B. In some aspects, the output from the memory device including the first die 608 and the second die 612 in system meta mode may be 32 bytes of data with 2 bytes of metadata (e.g., ECC metadata).

Figure 7:
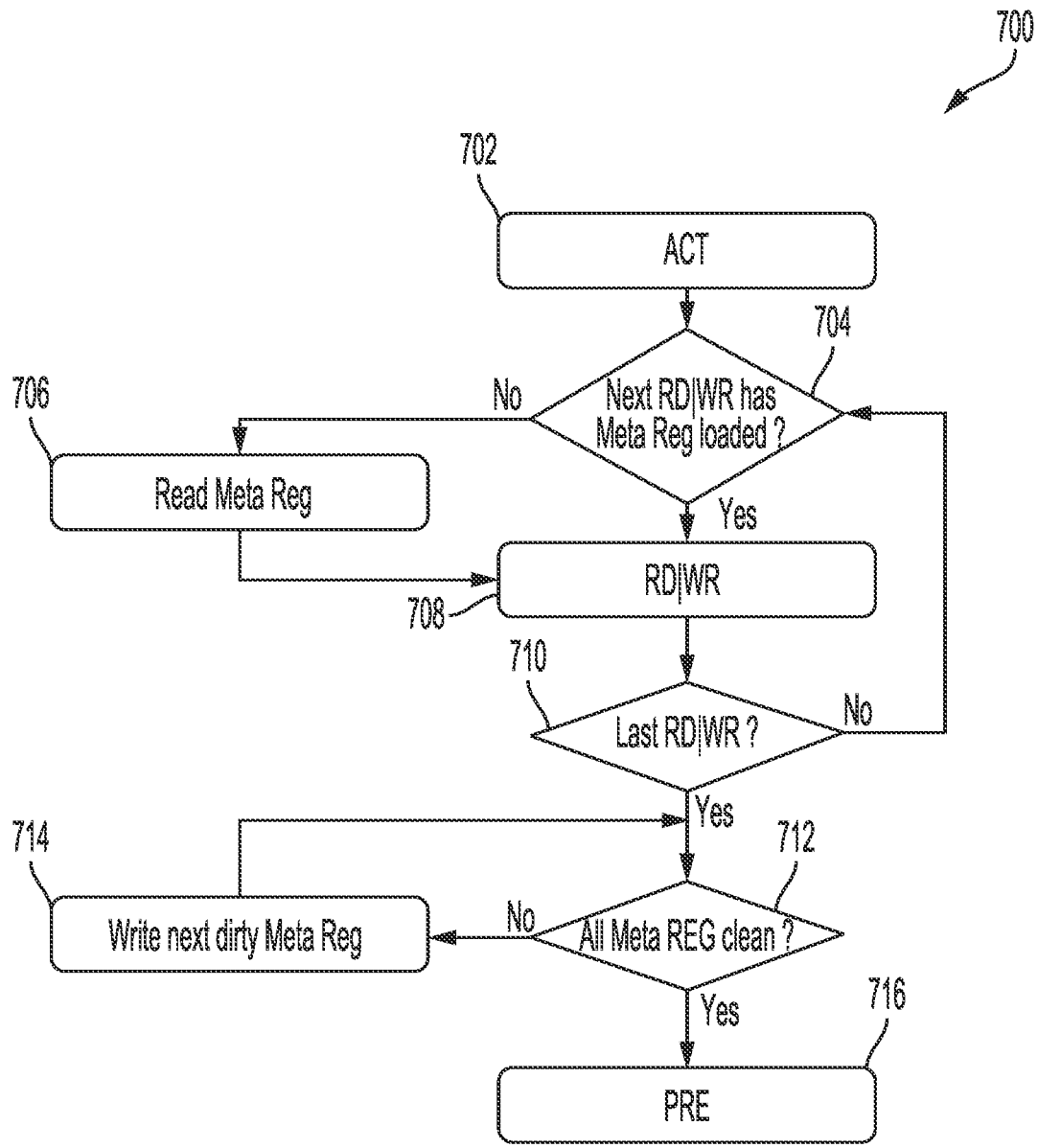
FIG. 7 is a flow chart illustrating a method of accessing rows in a memory device according to one or more aspects of the disclosure.

In system meta mode one or more of the following may occur during operation of the memory device including the first die 608 and the second die 612: metadata are transferred along with data, metadata are collocated with data in same row, metadata registers are introduced to transfer metadata to/from the DDR row, and/or metadata registers are controlled by new RD_meta and WR_meta commands, which may also be referred to as READ META and WRITE META commands. The RD_meta command may, for example, be used to read metadata from the memory arrays associated with the ranks 604A-B to the metadata registers of logic 602A-B, and the WR_meta command may, for example, be used to write metadata from the metadata registers of logic 602A-B to the memory arrays associated with the ranks 604A-B. Thus, as discussed herein, the memory device including the first die 608 and the second die 612 may be configured in a system meta mode for storage of related data and metadata in a same row of a memory array, such as a memory array associated with the first rank 604A or a memory array associated with the second rank 604B, of the memory device. One example of row access operations for operating the memory device including the first die 608 and the second die 612 in system meta mode is shown in FIG. 7. FIG. 7 is a flow chart illustrating a method 700 of accessing rows in a memory device according to one or more aspects of the disclosure. At block 702, a row of a memory array, such as a memory array associated with a first rank, may be activated. At block 704, a determination may be made of whether a next data access operation, such as a next read or write operation, includes metadata loaded in a metadata register, such as a metadata register of logic 602A, of a memory device. If the metadata has not been loaded to the metadata register, the memory device may, at block 706, read metadata to the metadata register from the memory array. The memory device may then, at block 708, perform the next data access operation. If the metadata has already been read to the metadata register, the memory device may proceed from the determination at block 704 to performing the data access operation at block 708. At block 710, a determination may be made of whether a previous data access operation was a final data access operation for the row. If the previous data access operation 708 was not the last data access operation for the row, then the method may repeat blocks 704, 706, and/or 708 for a remaining data access operation for the row. If the previous data access operation 708 was a last data access operation, a determination may be made at block 712 of whether all metadata registers associated with the memory array are clean. The metadata registers may be referred to as clean, for example, when the contents of the metadata registers have been written to the memory array and dirty when the contents of the metadata registers have not yet been written to the memory array. If the metadata registers are determined not to be clean at block 712, a next dirty metadata register may be written to the memory array at block 714. The method may then return to block 712, and blocks 712 and 714 may be repeated until a determination is made that all metadata registers associated with the memory array are clean. When a determination is made, at block 712, that all of the metadata registers are clean, the memory device may proceed to a pre-charge operation at block 716. Thus, when data and metadata are stored in a same row of a memory array in a system meta mode, data and metadata may be read from and/or written to the memory of the device.

Storing metadata in the same memory device as the corresponding data can result in reduced performance. Metadata is smaller in size (e.g., number of bits) than the corresponding data, which results in some inefficiencies in accessing the metadata. For example, when the metadata size is smaller than the word size of the memory device, storing metadata may require reading a word to retrieve the previously stored metadata, modifying a portion of the metadata word, and writing the combined previously-stored metadata and new metadata. Thus, a write operation of the metadata may also include performing a read operation and other processing. Thus, writing metadata to a memory, such as a DDR memory, configured to operate in a system meta mode can significantly reduce the useable bandwidth. For example, a stream of write 64 bytes (WR 64B) operations at random addresses of a DDR memory without metadata access can utilize close to 100% of the DDR bandwidth. When metadata are accessed, each WR 64B operation will require an additional read 32 bytes (RD 32B) operation for the metadata, an operation to update the 4B of metadata corresponding to the 64 B data and then a WR 32 B operation to store the updated metadata back into the memory array. Reading of metadata in conjunction with data write command is a function of the metadata being stored in the same row as the data in the system meta mode. Consequently, the DDR bandwidth required to access data and metadata stored in a system meta mode may be twice the bandwidth required to access data stored separately from metadata. Furthermore, READ to WRITE bus turnaround further reduces DDR access efficiency by approximately 20%. Consequently, the usable DDR bandwidth may be reduced by up to and, in some cases, exceeding 30% when operating in a system meta mode. Thus, in some cases, DDR bandwidth utilization when metadata are accessed with regular READ and WRITE commands may be approximately 50%-60% compared to 70%-80% when metadata are not accessed. Use of system meta mode commands, READ META and WRITE META, to read and write metadata may not remedy such issues when a single rank is accessed as a bandwidth of an internal bus, such as 610A or 610B of FIG. 6, may be limited in a similar way.

Inefficiencies that arise when a memory system is operating in a system meta mode, with data and metadata stored in a same row or page of a memory of the memory system, can be reduced by interleaving operations between banks of a multi-rank memory device, such as a device with two ranks (dual rank), four ranks (quad rank), or eight ranks (octal rank). For example, with reference to FIG. 6, as metadata accesses with READ META or WRITE META commands do not transfer data on the external bus 606 but only on the internal bus 610A-B conflict between metadata accesses and data accesses can be reduced or eliminated by accessing data in a first rank while accessing metadata in a second rank. As one example, with reference to FIG. 6, data stored in the first rank 604A may be accessed by logic 602A via bus 610A while metadata stored in the second rank 604B is accessed via the second bus 610B.

Figure 8:
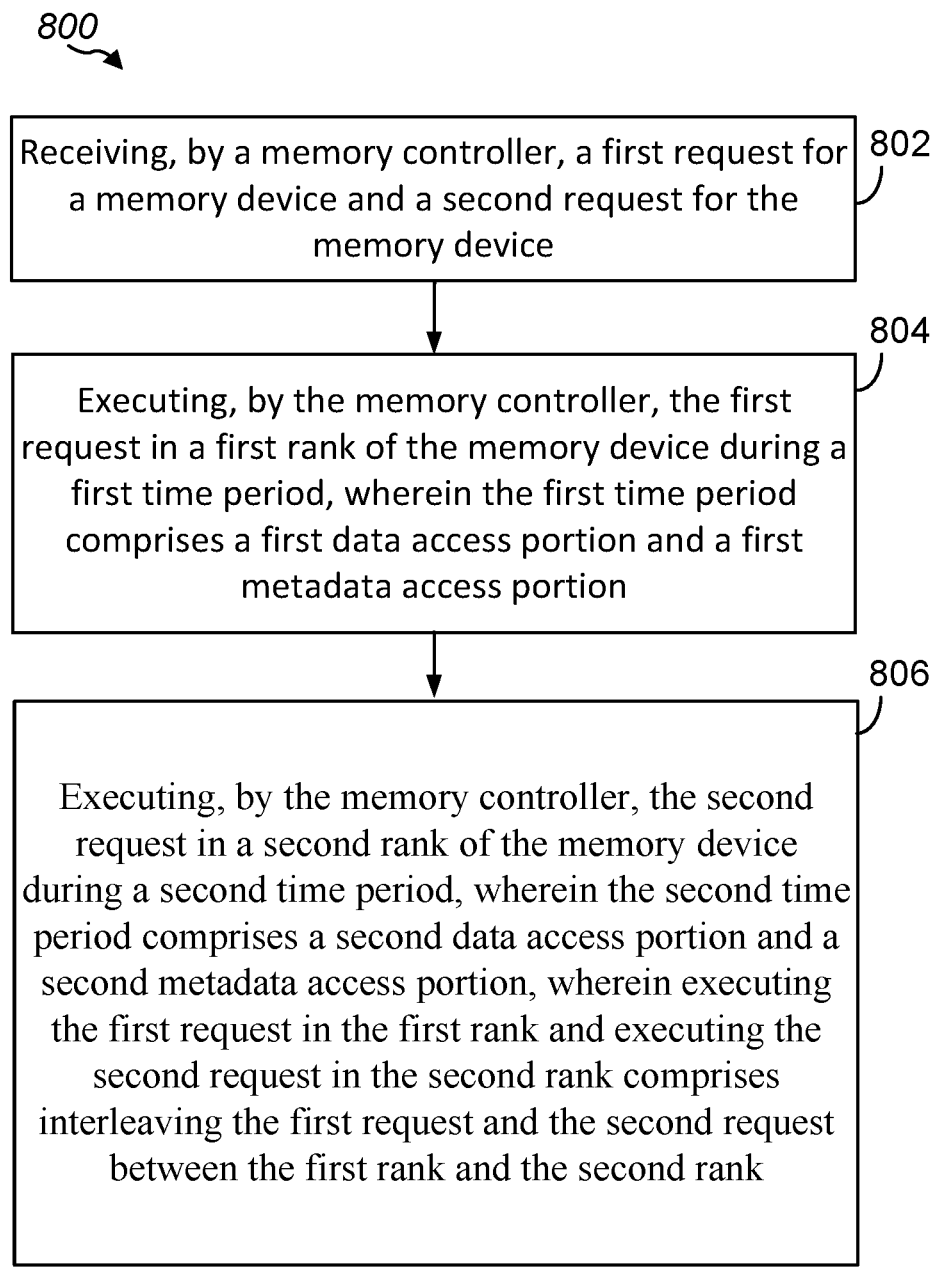
FIG. 8 is a flow chart illustrating a method of interleaving operations between ranks of a memory device according to one or more aspects of the disclosure.

In one example interleaving operation, a first request and a second request may be interleaved between a first rank and a second rank in a memory device. Thus, interleaving requests to different memory ranks, as described herein, may refer to initiating requests in an interleaved fashion, with a request to a first rank being initiated, followed by initiation of a request to a second rank. In some aspects, a request to the first rank may be initiated following initiation of the request to the second rank. Thus, requests to different ranks may be interleaved. In some aspects, such interleaving may include initiation of the request to the second rank prior to completion of the request to the first rank and/or initiation of a second request to the first rank prior to completion of the request to the second rank. An example operation for a memory controller, such as the memory controller of the host device and/or the memory controller of the memory device for interleaving operations between ranks is described in FIG. 8. FIG. 8 is a flow chart illustrating a method 800 of interleaving operations between ranks of a memory device according to one or more aspects of the disclosure. At block 802, a memory controller may receive a first request for a memory device and a second request for the memory device. The first request may, for example, be a first data access request. In particular, the first request may, for example, be a first request to read data and metadata from or write data and metadata to a first rank of the memory device, such as a first memory array associated with a first rank of the memory device. Likewise, the second request may, for example, be a second data access request and may be a second request to read data and metadata from or write data and metadata to a second rank of the memory device, such as a second memory array associated with a second rank of the memory device. In some aspects, the memory controller may be configured to access the memory device in a system meta mode. In some aspects, the memory device may include a plurality of DRAM modules, and the memory controller may be configured to access the DRAM modules by storing data in a first portion of memory locations and storing metadata in a second portion of memory locations. In some aspects, the metadata may include ECC metadata. In some aspects, the memory device may include an LPDDR memory module, and the memory controller may be configured to communicate with the LPDDR memory module. In some aspects, the memory controller may be connected to a write buffer to allow a write request to be scheduled efficiently without conflicting with a next request in the same rank.

At block 804, the memory controller may execute the first request in a first rank of the memory device during a first time period. The first time period may, for example, comprise a first data access portion and a first metadata access portion. For example, in response to a first request to access data and metadata stored in a first rank of the memory device, the memory device may, during a first portion of a first time period, access the data stored in the first rank of the memory device and, during a second portion of the first time period, access the metadata stored in the first rank of the memory device.

At block 806, the memory controller may execute the second request in a second rank of the memory device during a second time period. The second time period may, for example, include a second data access portion and a second metadata access portion. For example, in response to a second request to access data and metadata stored in a second rank of the memory device, the memory device may, during a first portion of a second time period, access the data stored in the first rank of the memory device and, during a second portion of the second time period, access the metadata stored in the first rank of the memory device. In executing the first request and the second request, the memory controller may interleave the first request and the second request between the first rank and the second rank. For example, to interleave the first request and the second request, the memory controller may perform one or more operations according to the first request in parallel with one or more operations according to the second request. As one particular example, the execution of the second request by the memory controller may be timed such that at least one of (1) the first data access portion of the first time period at least partially overlaps with the second metadata access portion of the second time period or (2) the first metadata access portion of the first time period at least partially overlaps with the second data access portion of the second time period. Thus, the memory controller may execute the first and second requests that metadata access at one memory rank is performed in parallel with data access at another memory rank.

In some aspects, the first request may comprise a write operation, and the second request may comprise a read operation. The first data access portion of the first request may comprise a first data write in the first rank and the second metadata access portion may comprise a first metadata read in the second rank. The first and second requests may be timed by the memory controller such that the first data write in the first rank at least partially overlaps the first metadata read in the second rank in time. In some aspects, the first time period during which the first request is executed may further comprise a third metadata access portion, comprising a first metadata write operation in the first rank. In some aspects, the first request may thus comprise a request for a first metadata read operation in the first rank, a request for a first data read or write operation in the first rank, and a request for a first metadata write operation in the first rank. The first metadata write operation in the first rank may at least partially overlap the second data access portion of the second time period in the second rank. In some aspects, executing the first request in the first rank may include opening a minimum number of banks in the first rank for executing the first request.

In some aspects, the memory controller may execute a third request in the first rank of the memory device during a third time period after the first time period. Executing the first request in the first rank may include accessing a first set of banks in the first rank and executing the third request in the first rank may comprise accessing a second set of banks in the first rank, mutually exclusive of the first set of banks. Metadata access operations, such as metadata read or metadata write operations, in a rank of a memory may overlap, in time, any metadata or data access operations, such as metadata or data read or metadata or data write operations, in another rank of the memory.

Figure 9:
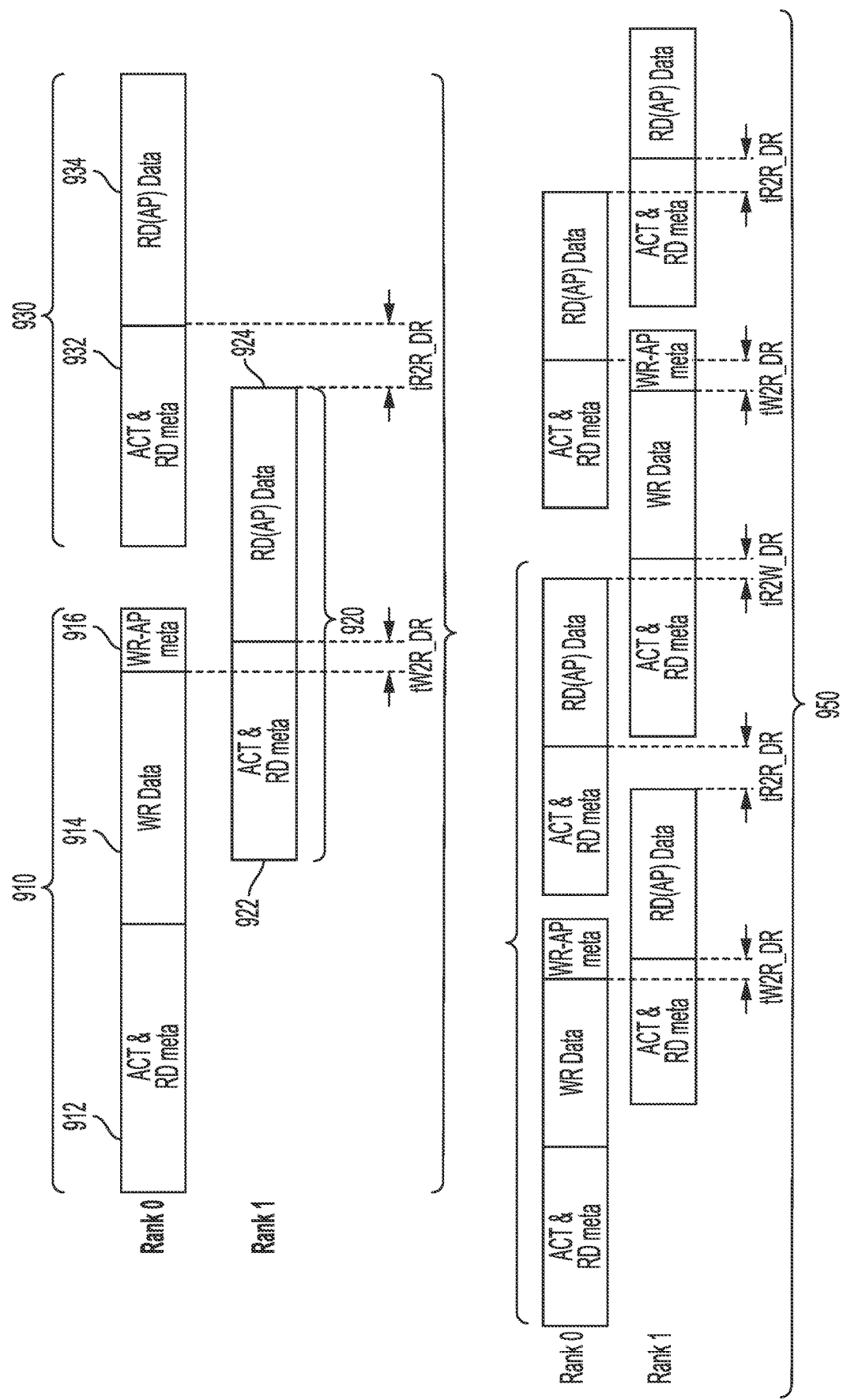
FIG. 9 is a block diagram illustrating interleaved operations involving data and metadata between ranks of a memory device according to one or more aspects of the disclosure.

FIG. 9 is a block diagram illustrating interleaved operations involving data and metadata between ranks of a memory device according to one or more aspects of the disclosure. A first portion of a series of interleaved operations 950 may include a first time period 910, a second time period 920, and a third time period 930, along with other time periods for interleaved operations for reading and writing data and metadata. The first time period 910 may include a first metadata access portion 912 for performing a first metadata access operation, a first data access portion 914 for performing a first data access operation, and a further metadata access portion 916 for performing a further metadata access operation. The second time period 920 may include a second metadata access portion 922 for performing a second metadata access operation and a second data access portion 924 for performing a second data access operation. The third time period 930 may include a third metadata access portion 932 for performing a third metadata access operation and a third data access portion 934 for performing a third data access operation. Interleaving the operations of time periods 910, 920, and 930 may be performed by arranging operations such that an operation of the first time period 910 accesses a first rank (RANK0), an operation of the second time period 920 accesses a second rank (RANK1), and an operation of the third time period 930 accesses the first rank (RANK0). The first time period 910, in this example corresponding to a write operation, may include a first portion for reading metadata in portion 912, a second portion for writing of data in portion 914, and a third portion for writing of metadata corresponding to the read metadata and the written data in portion 916. The second time period 920, in this example corresponding to a read operation, may include a first portion for reading metadata in portion 922 and a second portion for reading data in portion 924.

Interleaving between ranks of a memory device may be scheduled to allow metadata operations to at least partially overlap with data operations within the same memory device by performing the overlapping operations on different ranks. Operations of the second time period 920 may be scheduled such that the data access portion 914 and the metadata access portion 916 of the first time period 910 at least partially overlap with the metadata access portion 922 of the second time period 920. Although the example interleaving between time periods 910 and 920 is between a write operation on RANK 0 and a read operation on RANK 1, the interleaving may be applied to other arrangements of operations. For example, data access portion 924 of the second time period 920 may overlap with metadata access portion 916 of the first time period 910 and metadata access portion 932 of the third time period 930, when the memory controller is scheduling two read operations as the second time period 920 and the third time period 930. The memory controller 130 may also schedule operations on the same rank, such as operations 910 and 930, such that the pages activated for each of the operations between back-to-back operations on a single rank are mutually exclusive. The scheduling of mutually exclusive pages on a single rank may be performed when time periods 910 and 930 are close enough in time such that the pages accessed in the first time period 910 cannot be closed prior to opening pages accessed in the third time period 930. This is especially important when the first operation is a set of write operations and the second operation a set of read operations. The memory controller may be configured to avoid scheduling write operations on banks that may be used by a subsequent set of read operations. A write scheduler of the memory controller can predictively schedule such read and write operations through use of a write buffer organized in 32 queues making information regarding subsequent operations available to the memory controller in the respective banks. Thus, the memory controller may be able to determine which banks are likely to be subject to upcoming read operations within a particular time threshold and avoid scheduling such banks for write operations that would conflict with the upcoming read operations. In scheduling interleaved read and write operations, when a read operation is performed on data, a memory controller may be configured to schedule commands to read metadata prior to commands to read associated data, although such commands may be scheduled contemporaneously. Likewise, when a write operation is performed on data, the memory controller may be configured to schedule commands to read metadata prior to commands to write data. Furthermore, when a write operation is performed on data, the memory controller may be configured to schedule commands to write associated metadata after commands to write data. However, in some cases the memory controller may schedule commands to write the data and commands to write the metadata to occur contemporaneously. As shown in FIG. 9 a time of transition between a write data operation and a read data operation may be referred to as a tW2R_DR, a time of transition between a read data operation and a write data operation may be referred to a tR2W_DR, and a time of transition between a read data operation and a subsequent read data operation may be referred to as a tR2R_DR.

Figure 11A:
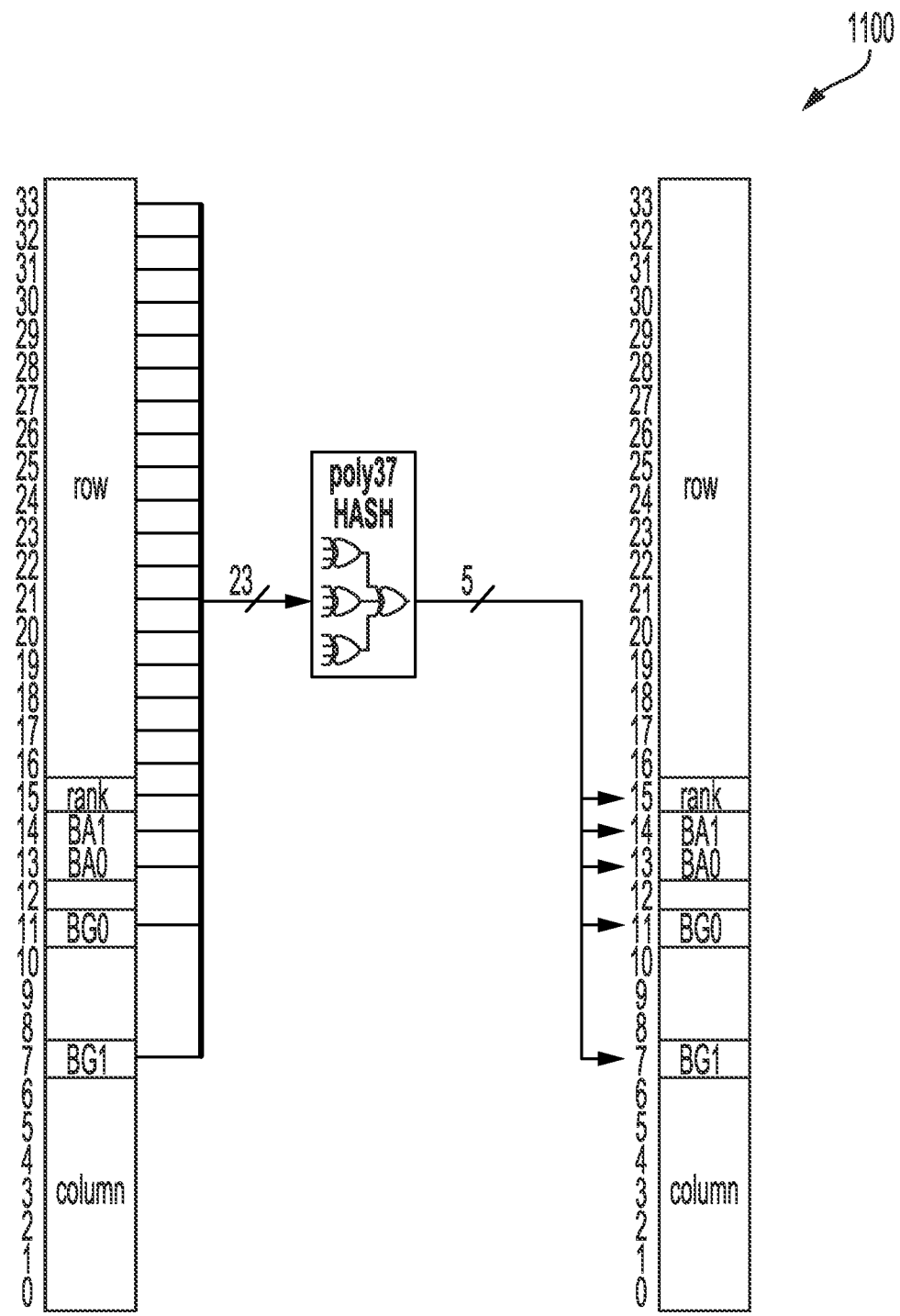
FIG. 11A is a first portion of a table of hashing for address mapping according to one or more aspects of the disclosure.
Figure 11B:
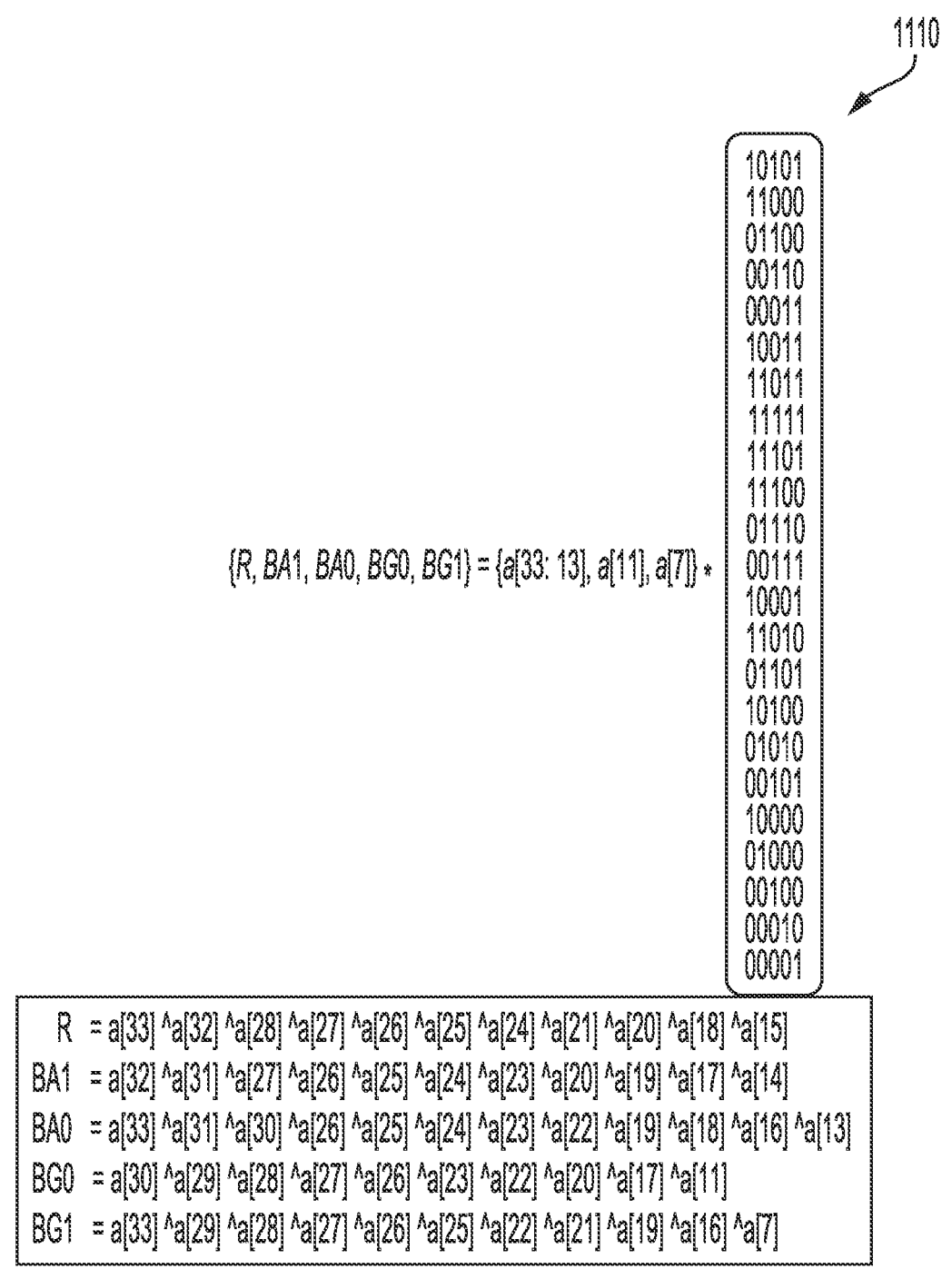

In some embodiments, a rank selection bit hashing may be performed to distribute incoming DDR operations across the two or more ranks, further enhancing efficiency. Interleaving batches of DRAM accesses between ranks may facilitate high DDR utilization in presence of metadata accesses, such as when a memory is configured to operate in a system meta mode. The memory controller may include a queue of operations waiting to be scheduled to the DRAM. The memory controller may schedule batches of read operations and batches of write operations. The batches should be scheduled alternately in different ranks. The transaction queue may contain transactions for multiple ranks, such as for two ranks in devices with two memory ranks, to allow the memory controller to select operations for a batch to be performed on a different rank after scheduling a batch of operations in a first rank. As one example, bits used to select the rank can be positioned just below the row bits, for example bit 15 in a dual rank DRAM system as shown in the first portion 1002 and the second portion 1004 of the physical address bit assignment mapping of FIG. 10. As another example, a rank bit may be hashed with a row bit to further randomize a distribution of access operations across the ranks, as shown in the first portion 1100 and the second portion 1110 of the table for hashing for address mapping of FIGS. 11A-B. For example, as shown in FIGS. 11A-B, a poly37 hash may be used to derive a hash matrix from primitive polynomials over GF(2): $x^5+x^2+1$.

Figure 12A:
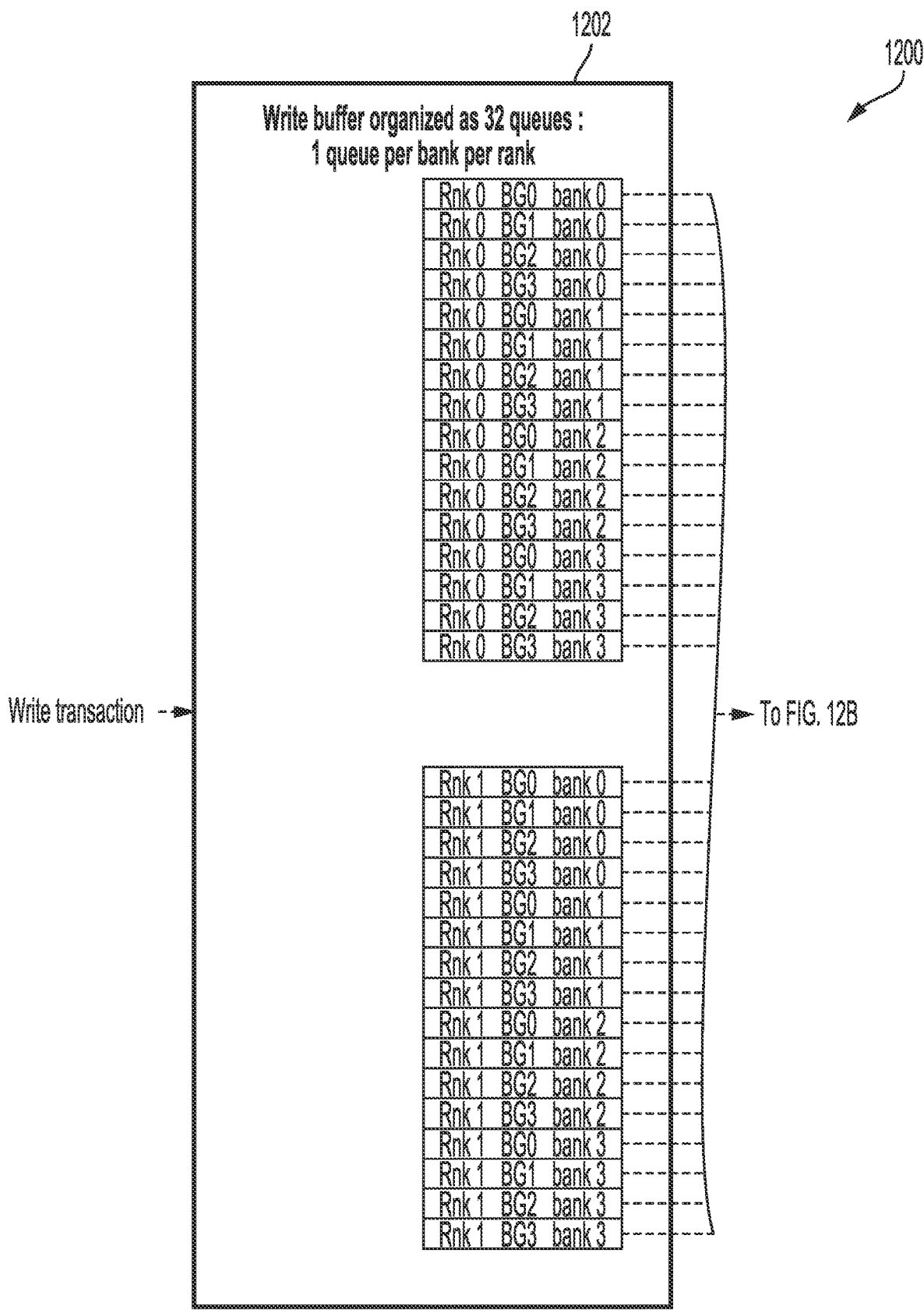
FIG. 12A is an example block diagram of a first portion of a write buffer and write scheduler for scheduling write operations according to one or more aspects of the disclosure.
Figure 12B:
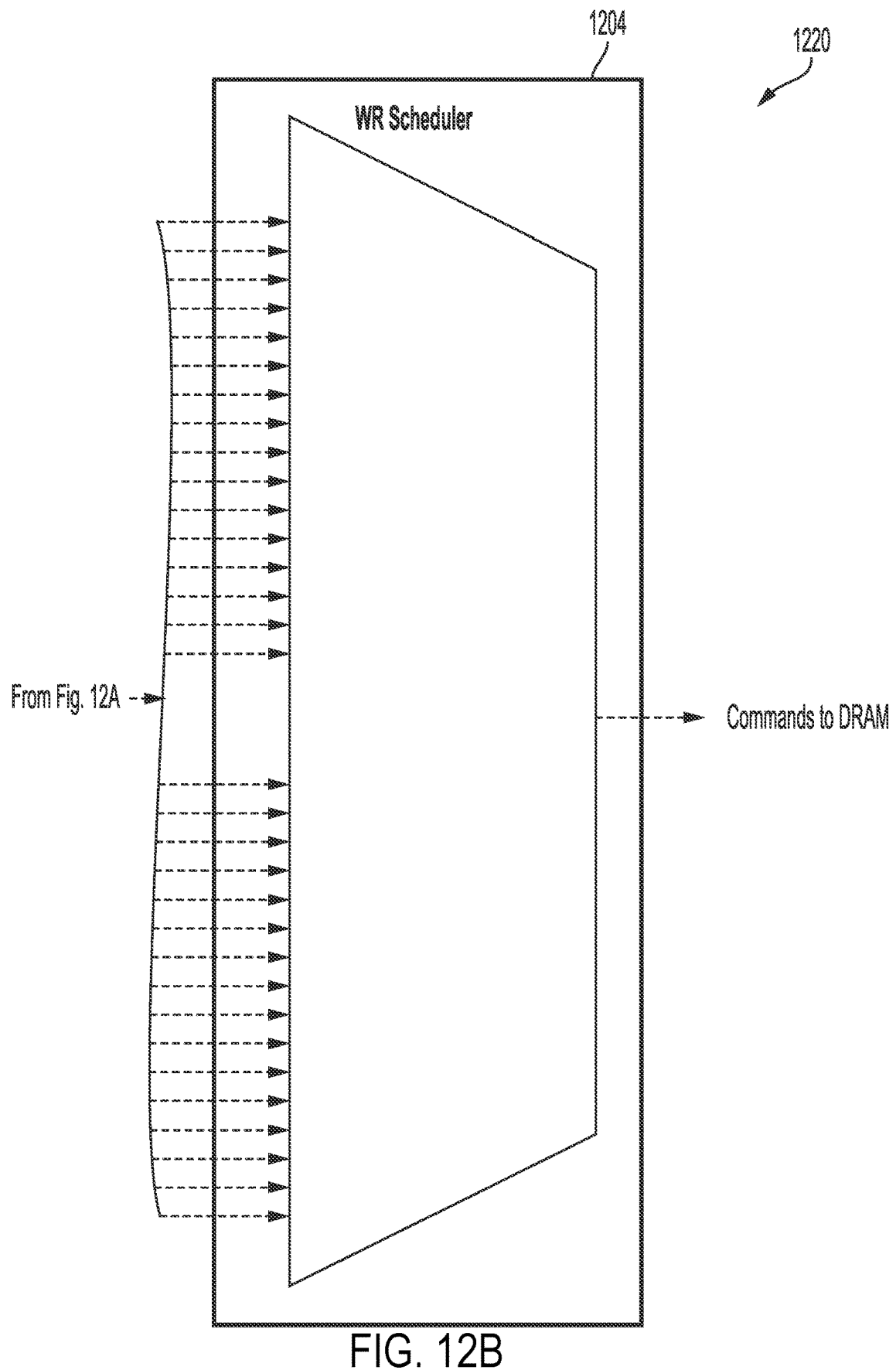
FIG. 12B is an example block diagram of a second portion of a write buffer and write scheduler for scheduling write operations according to one or more aspects of the disclosure.

In some embodiments, write operations may be accumulated in a buffer and subsequently evicted to the memory controller in a DRAM efficient order. An example block diagram 1200, 1220 of a write buffer and a write scheduler for efficient scheduling of write operations is shown in FIGS. 12A-B. A write buffer 1202 may, for example, be a partition of a system cache organized as a set of queues with one queue par bank per rank. For example, a write buffer for an LPDDR5 or LPDDR6 dual rank system may include 32 queues, as shown in the write buffer 1202 of FIG. 12A. A write transaction may be received by the write buffer 1202 and placed in a queue. A write scheduler 1204 may schedule write operations from the write buffer 1202, such as by selecting a batch of write operations for a rank different from a previous batch rank, minimizing a number of banks activated during a batch of write operations, and enacting a preference for write operations for banks that do not conflict with pending read operations. With such organization, the write scheduler 1204 may simultaneously observe candidate write operations in every bank and may select write transactions that can be scheduled in a desired rank with maximum efficiency and without penalizing a read operation already present in the memory controller. The write scheduler 1204 may transmit one or more selected buffered write commands to a memory controller of the memory device, such as a memory controller of a DRAM device.

A wireless communications device may include a memory system as illustrated in at least FIG. 1 and FIG. 2 and configured to receive and output data, including ECC or other metadata, from the memory array and interleave operations on different ranks of the memory device comprising the memory array to reduce overhead associated with storing metadata in the memory array with the data. The memory system according to any of the aspects disclosed herein, may be provided in or integrated into any processor-based device. Examples, without limitation, include a set top box, an entertainment unit, a navigation device, a communications device, a fixed location data unit, a mobile location data unit, a global positioning system (GPS) device, a mobile phone, a cellular phone, a smart phone, a session initiation protocol (SIP) phone, a tablet, a phablet, a server, a computer, a portable computer, a mobile computing device, a wearable computing device (e.g., a smart watch, a health or fitness tracker, eyewear, etc.), a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, a portable digital video player, an automobile, a vehicle component, or avionics systems.

In one or more aspects, techniques for memory storage and retrieval may include additional aspects, such as any single aspect or any combination of aspects described below or in connection with one or more other processes or devices described elsewhere herein. In a first aspect, supporting data operations may include an apparatus configured to perform operations including receiving, by one or more memory controllers, a first request for a memory device and a second request for the memory device, executing, by the one or more memory controllers, the first request in a first rank of the memory device during a first time period, wherein the first time period comprises a first data access portion and a first metadata access portion, and executing, by the one or more memory controllers, the second request in a second rank of the memory device during a second time period, wherein the second time period comprises a second data access portion and a second metadata access portion, wherein executing the first request in the first rank and executing the second request in the second rank comprises interleaving the first request and the second request between the first rank and the second rank.

Additionally, the apparatus may perform or operate according to one or more aspects as described below. In some implementations, the apparatus includes a wireless device, such as a UE. In some implementations, the apparatus includes a remote server, such as a cloud-based computing solution, which receives image data for processing to determine output image frames. In some implementations, the apparatus may include at least one processor, and a memory coupled to the processor. The processor may be configured to perform operations described herein with respect to the apparatus. In some other implementations, the apparatus may include a non-transitory computer-readable medium having program code recorded thereon and the program code may be executable by a computer for causing the computer to perform operations described herein with reference to the apparatus. In some implementations, the apparatus may include one or more means configured to perform operations described herein. In some implementations, a method of wireless communication may include one or more operations described herein with reference to the apparatus. In some implementations, the apparatus may comprise one or more memory controllers configured to perform operations described herein with respect to the apparatus. In some implementations, the apparatus may comprise a host device configured to communicate with a memory module through a channel. The host device may include one or more memory controllers coupled to the channel and configured to perform the operations described wherein with respect to the apparatus.

In a second aspect, in combination with the first aspect, the execution of the second request by the one or more memory controllers is timed such that at least one of (1) the first data access portion at least partially overlaps with the second metadata access portion or (2) the first metadata access portion at least partially overlaps with the second data access portion.

In a third aspect, in combination with one or more of the first aspect or the second aspect, the first request comprises a write operation and the second request comprises a read operation, and the first data access portion of the first request comprises a first data write in the first rank and the second metadata access portion comprises a first metadata read in the second rank, where the first data write in the first rank at least partially overlaps the first metadata read in the second rank In a fourth aspect, in combination with one or more of the first aspect through the third aspect, the first time period further comprises a third metadata access portion comprising a first metadata write in the first rank, and the first metadata write in the first rank at least partially overlaps the second data access portion of the second time period in the second rank.

In a fifth aspect, in combination with one or more of the first aspect through the fourth aspect, executing the first request in the first rank comprises opening a minimum number of banks in the first rank for executing the first request.

In a sixth aspect, in combination with one or more of the first aspect through the fifth aspect, the apparatus is further configured to perform operations comprising executing, by the one or more memory controllers, a third request in the first rank of the memory device during a third time period after the first time period, wherein executing the first request in the first rank comprises accessing a first set of banks in the first rank and executing the third request in the first rank comprises accessing a second set of banks mutually exclusive of the first set of banks.

In a seventh aspect, in combination with one or more of the first aspect through the sixth aspect, the one or more memory controllers are configured to access the memory device in a system meta mode.

In an eighth aspect, in combination with one or more of the first aspect through the seventh aspect, the memory device comprises a plurality of dynamic random access memory (DRAM) modules and the one or more memory controllers are configured to access the DRAM modules by storing data in a first portion of memory locations and storing metadata in a second portion of memory locations.

In a ninth aspect, in combination with one or more of the first aspect through the eighth aspect, the metadata comprises error correction codes (ECCs).

In a tenth aspect, in combination with one or more of the first aspect through the ninth aspect, the one or more memory controllers are configured to communicate with a low power double data rate (LPDDR) memory module.

In the description of embodiments herein, numerous specific details are set forth, such as examples of specific components, circuits, and processes to provide a thorough understanding of the present disclosure. The term "coupled" as used herein means connected directly to or connected through one or more intervening components or circuits. Also, in the following description and for purposes of explanation, specific nomenclature is set forth to provide a thorough understanding of the present disclosure. However, it will be apparent to one skilled in the art that these specific details may not be required to practice the teachings disclosed herein. In other instances, well known circuits and devices are shown in block diagram form to avoid obscuring teachings of the present disclosure.

Some portions of the detailed descriptions which follow are presented in terms of procedures, logic blocks, processing, and other symbolic representations of operations on data bits within a computer memory. In the present disclosure, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

In the figures, a single block may be described as performing a function or functions. The function or functions performed by that block may be performed in a single component or across multiple components, and/or may be performed using hardware, software, or a combination of hardware and software. To clearly illustrate this interchangeability of hardware and software, various illustrative components, blocks, modules, circuits, and steps are described below generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example devices may include components other than those shown, including well-known components such as a processor, memory, and the like.

Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving," "settling," "generating," or the like, refer to the actions and processes of a computer system, or similar electronic computing device, that manipulates and transforms data represented as physical (electronic) quantities within the computer system's registers and memories into other data similarly represented as physical quantities within the computer system's registers, memories, or other such information storage, transmission, or display devices.

The terms "device" and "apparatus" are not limited to one or a specific number of physical objects (such as one smartphone, one camera controller, one processing system, and so on). As used herein, a device may be any electronic device with one or more parts that may implement at least some portions of the disclosure. While the description and examples herein use the term "device" to describe various aspects of the disclosure, the term "device" is not limited to a specific configuration, type, or number of objects. As used herein, an apparatus may include a device or a portion of the device for performing the described operations.

Certain components in a device or apparatus described as "means for accessing," "means for receiving," "means for sending," "means for using," "means for selecting," "means for determining," "means for normalizing," "means for multiplying," or other similarly-named terms referring to one or more operations on data, such as image data, may refer to processing circuitry (e.g., application specific integrated circuits (ASICs), digital signal processors (DSP), graphics processing unit (GPU), central processing unit (CPU)) configured to perform the recited function through hardware, software, or a combination of hardware configured by software.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and the modules described herein with respect to at least FIG. 1 and FIG. 2 include processors, electronics devices, hardware devices, electronics components, logical circuits, memories, software codes, firmware codes, among other examples, or any combination thereof. Software shall be construed broadly to mean instructions, instruction sets, code, code segments, program code, programs, subprograms, software modules, application, software applications, software packages, routines, subroutines, objects, executables, threads of execution, procedures, and/or functions, among other examples, whether referred to as software, firmware, middleware, microcode, hardware description language or otherwise. In addition, features discussed herein may be implemented via specialized processor circuitry, via executable instructions, or combinations thereof.

Those of skill in the art that one or more blocks (or operations) described with reference to the figures included with this description may be combined with one or more blocks (or operations) described with reference to another of the figures. For example, one or more blocks (or operations) of FIG. 3A-3B may be combined with one or more blocks (or operations) of FIG. 1 or FIG. 2. As another example, one or more blocks (or operations) of FIGS. 7 or FIG. 8 may be combined with one or more blocks (or operations) of FIG. 1, FIG. 2, FIG. 3A, FIG. 3B, FIG. 4A, FIG. 4B, FIGS. 5A-B, or FIG. 6.

Those of skill in the art would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits, and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, or any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, which is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media may include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, opposing terms such as "upper" and "lower," or "front" and back," or "top" and "bottom," or "forward" and "backward" are sometimes used for ease of describing the figures, and indicate relative positions corresponding to the orientation of the figure on a properly oriented page, and may not reflect the proper orientation of any device as implemented.

As used herein, the term "coupled to" in the various tenses of the verb "couple" may mean that element A is directly connected to element B or that other elements may be connected between elements A and B (i.e., that element A is indirectly connected with element B), to operate certain intended functions. In the case of electrical components, the term "coupled to" may also be used herein to mean that a wire, trace, or other electrically conductive material is used to electrically connect elements A and B (and any components electrically connected therebetween). In some examples, the term "coupled to" mean a transfer of electrical energy between elements A and B, to operate certain intended functions.

In some examples, the term "electrically connected" mean having an electric current or configurable to having an electric current flowing between the elements A and B. For example, the elements A and B may be connected via resistors, transistors, or an inductor, in addition to a wire, trace, or other electrically conductive material and components. Furthermore, for radio frequency functions, the elements A and B may be "electrically connected" via a capacitor.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown, or in sequential order, or that all illustrated operations be performed to achieve desirable results. Further, the drawings may schematically depict one or more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

As used herein, including in the claims, the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof.

The term "substantially" is defined as largely, but not necessarily wholly, what is specified (and includes what is specified; for example, substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes 0.1, 1, 5, or 10 percent.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. An apparatus, comprising:
one or more memory controllers configured to perform operations comprising:
receiving a first request for a memory device and a second request for the memory device;
executing the first request in a first rank of the memory device during a first time period, wherein the first request comprises a write operation, wherein the first time period comprises a first data access portion and a first metadata access portion, and wherein the first data access portion comprises a first data write in the first rank;
executing the second request in a second rank of the memory device during a second time period, wherein the second request comprises a read operation, wherein the second time period comprises a second data access portion and a second metadata access portion, wherein the second metadata access portion comprises a first metadata read in the second rank, and wherein the first data write in the first rank at least partially overlaps the first metadata read in the second rank; and executing a third request in the first rank of the memory device during a third time period after the first time period, wherein the third time period comprises a third data access portion and a third metadata access portion;

wherein executing the first request in the first rank and executing the second request in the second rank comprises interleaving the first request and the second request between the first rank and the second rank, and wherein executing the third request in the first rank and executing the second request in the second rank comprises interleaving the second request and the third request between the first rank and the second rank.

2. The apparatus of claim 1, wherein the execution of the second request by the one or more memory controllers is timed such that the first metadata access portion at least partially overlaps with the second data access portion.

3. The apparatus of claim 2, wherein the first time period further comprises a third metadata access portion comprising a first metadata write in the first rank, and wherein the first metadata write in the first rank at least partially overlaps the second data access portion of the second time period in the second rank.

4. The apparatus of claim 2, wherein executing the first request in the first rank comprises opening a minimum number of banks in the first rank for executing the first request.

5. The apparatus of claim 1, wherein executing the first request in the first rank comprises accessing a first set of banks in the first rank and executing the third request in the first rank comprises accessing a second set of banks mutually exclusive of the first set of banks.

6. The apparatus of claim 1, wherein the one or more memory controllers are configured to access the memory device in a system meta mode.

7. The apparatus of claim 1, wherein the memory device comprises a plurality of dynamic random access memory (DRAM) modules, wherein the one or more memory controllers are configured to access the DRAM modules by storing data in a first portion of memory locations and storing metadata in a second portion of memory locations.

8. The apparatus of claim 7, wherein the metadata comprises error correction codes (ECCs).

9. The apparatus of claim 1, wherein the one or more memory controllers are configured to communicate with a low power double data rate (LPDDR) memory module.

10. A method, comprising:
receiving, by one or more memory controllers, a first request for a memory device and a second request for the memory device;
executing, by the one or more memory controllers, the first request in a first rank of the memory device during a first time period, wherein the first request comprises a write operation, wherein the first time period comprises a first data access portion and a first metadata access portion, and wherein the first data access portion comprises a first data write in the first rank;
executing, by the one or more memory controllers, the second request in a second rank of the memory device during a second time period, wherein the second request comprises a read operation, wherein the second time period comprises a second data access portion and a second metadata access portion, wherein the second metadata access portion comprises a first metadata read in the second rank, and wherein the first data write in the first rank at least partially overlaps the first metadata read in the second rank; and executing, by the one or more memory controllers, a third request in the first rank of the memory device during a third time period after the first time period, wherein the third time period comprises a third data access portion and a third metadata access portion, wherein executing the first request in the first rank and executing the second request in the second rank comprises interleaving the first request and the second request between the first rank and the second rank, and wherein executing the third request in the first rank and executing the second request in the second rank comprises interleaving the second request and the third request between the first rank and the second rank.

11. The method of claim 10, wherein the execution of the second request by the one or more memory controllers is timed such that the first metadata access portion at least partially overlaps with the second data access portion.

12. The method of claim 11, wherein the first time period further comprises a third metadata access portion comprising a first metadata write in the first rank, and wherein the first metadata write in the first rank at least partially overlaps the second data access portion of the second time period in the second rank.

13. The method of claim 11, wherein executing the first request in the first rank comprises opening a minimum number of banks in the first rank for executing the first request.

14. The method of claim 10, wherein executing the first request in the first rank comprises accessing a first set of banks in the first rank and executing the third request in the first rank comprises accessing a second set of banks mutually exclusive of the first set of banks.

15. The method of claim 10, wherein the one or more memory controllers are configured to access the memory device in a system meta mode.

16. The method of claim 10, wherein the memory device comprises a plurality of dynamic random access memory (DRAM) modules, wherein the one or more memory controllers are configured to access the DRAM modules by storing data in a first portion of memory locations and storing metadata in a second portion of memory locations.

17. The method of claim 10, wherein metadata comprises error correction codes (ECCs).

18. The method of claim 10, wherein the one or more memory controllers are configured to communicate with a low power double data rate (LPDDR) memory module.

19. An apparatus, comprising:
a host device configured to communicate with a memory module through a channel, the host device comprising one or more memory controllers coupled to the channel, the one or more memory controllers configured perform operations including:
receiving a first request for a memory device and a second request for the memory device, wherein the first request comprises a write operation and the second request comprises a read operation;
executing the first request in a first rank of the memory device during a first time period, wherein the first time period comprises a first data access portion and a first metadata access portion, and wherein the first data access portion comprises a first data write in the first rank;
executing the second request in a second rank of the memory device during a second time period, wherein the second time period comprises a second data access portion and a second metadata access portion, wherein the second metadata access portion comprises a first metadata read in the second rank, and wherein the first data write in the first rank at least partially overlaps the first metadata read in the second rank; and executing a third request in the first rank of the memory device during a third time period after the first time period, wherein the third time period comprises a third data access portion and a third metadata access portion, wherein executing the first request in the first rank and executing the second request in the second rank comprises interleaving the first request and the second request between the first rank and the second rank, and wherein executing the third request in the first rank and executing the second request in the second rank comprises interleaving the second request and the third request between the first rank and the second rank.

20. The apparatus of claim 19, wherein the execution of the second request by the one or more memory controllers is timed such that the first metadata access portion at least partially overlaps with the second data access portion.

21. The apparatus of claim 20, wherein the first time period further comprises a third metadata access portion comprising a first metadata write in the first rank, and wherein the first metadata write in the first rank at least partially overlaps the second data access portion of the second time period in the second rank.

22. The apparatus of claim 20, wherein executing the first request in the first rank comprises opening a minimum number of banks in the first rank for executing the first request.

23. The apparatus of claim 19, wherein executing the first request in the first rank comprises accessing a first set of banks in the first rank and executing the third request in the first rank comprises accessing a second set of banks mutually exclusive of the first set of banks.

24. The apparatus of claim 19, wherein the one or more memory controllers are configured to access the memory device in a system meta mode.

25. The apparatus of claim 19, wherein the memory device comprises a plurality of dynamic random access memory (DRAM) modules, wherein the one or more memory controllers are configured to access the DRAM modules by storing data in a first portion of memory locations and storing metadata in a second portion of memory locations.

26. The apparatus of claim 19, wherein metadata comprises error correction codes (ECCs).

27. The apparatus of claim 19, wherein the one or more memory controllers is configured to communicate with a low power double data rate (LPDDR) memory module.

* * * * *